(12) United States Patent
Zhou

(10) Patent No.: US 9,250,079 B2
(45) Date of Patent: *Feb. 2, 2016

(54) NAVIGATION SYSTEM WITH PARKING LOT INTEGRATED ROUTING MECHANISM AND METHOD OF OPERATION THEREOF

(71) Applicant: Telenav, Inc., Sunnyvale, CA (US)

(72) Inventor: Leqing Zhou, San Jose, CA (US)

(73) Assignee: TELENAV, INC., Sunnyvale, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/141,808

(22) Filed: Dec. 27, 2013

(65) Prior Publication Data
US 2014/0114562 A1    Apr. 24, 2014

Related U.S. Application Data

(63) Continuation of application No. 12/889,608, filed on Sep. 24, 2010, now Pat. No. 8,738,283.

(51) Int. Cl.
*G01C 21/30* (2006.01)
*G01C 21/32* (2006.01)
*G01C 21/00* (2006.01)
*G01C 21/36* (2006.01)

(52) U.S. Cl.
CPC ............ *G01C 21/00* (2013.01); *G01C 21/3611* (2013.01); *G01C 21/3685* (2013.01)

(58) Field of Classification Search
CPC .. G01C 21/3685; G01C 21/00; G01C 21/3611
USPC .......................................................... 701/410
See application file for complete search history.

(56) References Cited

U.S. PATENT DOCUMENTS

| 6,209,026 | B1 | 3/2001 | Ran et al. |
| 6,411,895 | B1 | 6/2002 | Lau et al. |
| 6,453,235 | B1 | 9/2002 | Endo et al. |
| 6,542,817 | B2 | 4/2003 | Miyaki |
| 2005/0165543 | A1 | 7/2005 | Yokota |
| 2006/0241857 | A1 | 10/2006 | Onishi et al. |
| 2008/0033640 | A1* | 2/2008 | Amano ........................ 701/209 |
| 2009/0271102 | A1 | 10/2009 | Inoguchi et al. |

OTHER PUBLICATIONS

International Search Report for PCT Application No. PCT/US2011/041697 dated Oct. 18, 2011.

* cited by examiner

*Primary Examiner* — Maceeh Anwari
(74) *Attorney, Agent, or Firm* — IP Investment Law Group

(57) ABSTRACT

A method of operation of a navigation system includes: identifying a physical location with a location unit; selecting a starting point based on the physical location; selecting a destination; identifying a destination lot associated with the destination; and calculating a vehicle travel route from the starting point to the destination with the vehicle travel route traversing through the destination lot with a control unit for displaying on a device.

18 Claims, 8 Drawing Sheets

NAVIGATION SYSTEM WITH PARKING LOT INTEGRATED ROUTING MECHANISM AND METHOD OF OPERATION THEREOF

CROSS-REFERENCE TO RELATED APPLICATION

This is a continuation of co-pending U.S. patent application Ser. No. 12/889,608 filed Sep. 24, 2010.

TECHNICAL FIELD

An embodiment of the present invention relates generally to a navigation system, and more particularly to a system with parking lot integrated routing mechanism.

BACKGROUND ART

Modern portable consumer and industrial electronics, especially client devices such as navigation systems, smart phones, portable digital assistants, and combination devices are providing increasing levels of functionality to support modern life including location-based information services. Research and development in the existing technologies can take a myriad of different directions.

As users become more empowered with the growth of mobile location based service devices, new and old paradigms begin to take advantage of this new device space. There are many technological solutions to take advantage of this new device location opportunity. One existing approach is to use location information to provide navigation services such as a global positioning system (GPS) for a car or on a mobile device such as a cell phone, portable navigation device (PND) or a personal digital assistant (PDA).

Often, the routing algorithm of navigation devices subjects the user to cumbersome and sometimes dangerous directions in light of simpler and safer choices. In unfamiliar areas, the user has no choice but to endure the longer travel time and the added dangers without even knowing of other choices.

Thus, a need still remains for a navigation system to provide information with improvement in usability, performance, and accuracy. In view of the importance of positioning systems in modern life, it is increasingly critical that answers be found to these problems.

Solutions to these problems have been long sought but prior developments have not taught or suggested any solutions and, thus, solutions to these problems have long eluded those skilled in the art.

DISCLOSURE OF THE INVENTION

The present invention provides a method of operation of a navigation system including: identifying a physical location with a location unit; selecting a starting point based on the physical location; selecting a starting point based on the physical location; identifying a destination lot associated with the destination; and calculating a vehicle travel route from the starting point to the destination with the vehicle travel route traversing through the destination lot with a control unit for displaying on a device.

The present invention provides a navigation system, including: a location unit for identifying a physical location; a control unit, coupled to the location unit, for: selecting a starting point based on the physical location; selecting a destination; identifying a destination lot associated with the destination; and calculating a vehicle travel route from the starting point to the destination with the vehicle travel route traversing through the destination lot for displaying on a device.

Certain embodiments of the invention have other steps or elements in addition to or in place of those mentioned above. The steps or elements will become apparent to those skilled in the art from a reading of the following detailed description when taken with reference to the accompanying drawings.

BEST MODE FOR CARRYING OUT THE INVENTION

Figure 1:
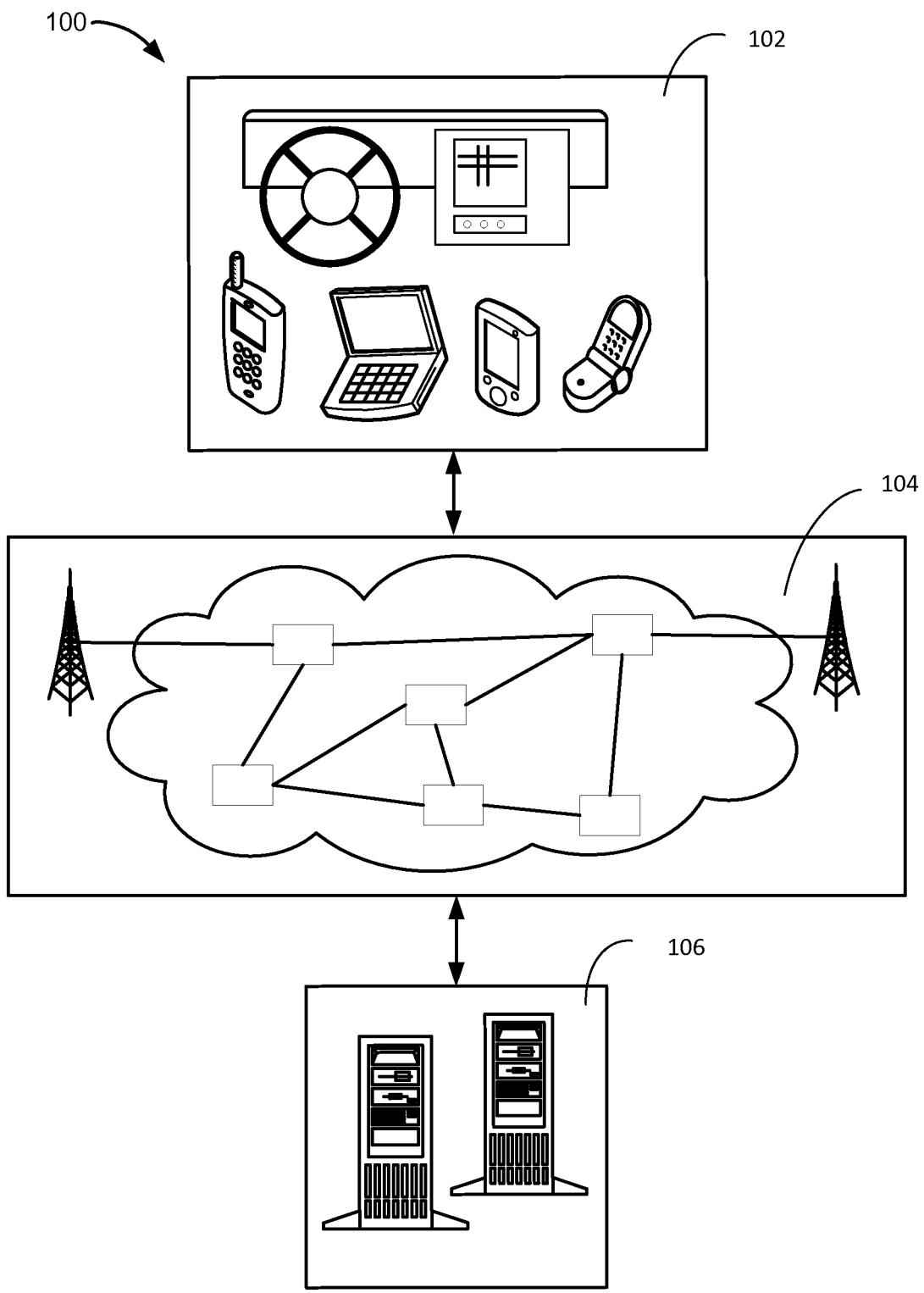
FIG. 1 is a navigation system with parking lot integrated routing mechanism in an embodiment of the present invention.

The following embodiments are described in sufficient detail to enable those skilled in the art to make and use the invention. It is to be understood that other embodiments would be evident based on the present disclosure, and that system, process, or mechanical changes may be made without departing from the scope of the present invention.

In the following description, numerous specific details are given to provide a thorough understanding of the invention. However, it will be apparent that the invention may be practiced without these specific details. In order to avoid obscuring the present invention, some well-known circuits, system configurations, and process steps are not disclosed in detail.

The drawings showing embodiments of the system are semi-diagrammatic and not to scale and, particularly, some of the dimensions are for the clarity of presentation and are shown exaggerated in the drawing FIGs. Similarly, although the views in the drawings for ease of description generally show similar orientations, this depiction in the FIGs. is arbitrary for the most part. Generally, the invention can be operated in any orientation. The embodiments have been numbered first embodiment, second embodiment, etc. as a matter of descriptive convenience and are not intended to have any other significance or provide limitations for the present invention.

One skilled in the art would appreciate that the format with which navigation information is expressed is not critical to some embodiments of the invention. For example, in some embodiments, navigation information is presented in the format of (X, Y), where X and Y are two ordinates that define the geographic location, i.e., a position of a user.

In an alternative embodiment, navigation information is presented by longitude and latitude related information. In a further embodiment of the present invention, the navigation information also includes a velocity element including a speed component and a heading component.

The term "relevant information" referred to herein comprises the navigation information described as well as information relating to points of interest to the user, such as local business, hours of businesses, types of businesses, advertised specials, traffic information, maps, local events, and nearby community or personal information.

The term "module" referred to herein can include software, hardware, or a combination thereof. For example, the software can be machine code, firmware, embedded code, and application software. Also for example, the hardware can be circuitry, processor, computer, integrated circuit, integrated circuit cores, a pressure sensor, an inertial sensor, a microelectromechanical system (MEMS), passive devices, or a combination thereof.

Referring now to FIG. 1, therein is shown a navigation system 100 with parking lot integrated routing mechanism in an embodiment of the present invention. The navigation system 100 includes a first device 102, such as a client or a server, connected to a second device 106, such as a client or server, with a communication path 104, such as a wireless or wired network.

For example, the first device 102 can be of any of a variety of mobile devices, such as a cellular phone, personal digital assistant, a notebook computer, automotive telematics navigation system, or other multi-functional mobile communication or entertainment device. The first device 102 can be a standalone device, or can be incorporated with a vehicle, for example a car, truck, bus, or train. The first device 102 can couple to the communication path 104 to communicate with the second device 106.

For illustrative purposes, the navigation system 100 is described with the first device 102 as a mobile computing device, although it is understood that the first device 102 can be different types of computing devices. For example, the first device 102 can also be a nonmobile computing device, such as a server, a server farm, or a desktop computer.

The second device 106 can be any of a variety of centralized or decentralized computing devices. For example, the second device 106 can be a computer, grid computing resources, a virtualized computer resource, cloud computing resource, routers, switches, peer-to-peer distributed computing devices, or a combination thereof.

The second device 106 can be centralized in a single computer room, distributed across different rooms, distributed across different geographical locations, embedded within a telecommunications network. The second device 106 can have a means for coupling with the communication path 104 to communicate with the first device 102. The second device 106 can also be a client type device as described for the first device 102.

In another example, the first device 102 can be a particularized machine, such as a mainframe, a server, a cluster server, rack mounted server, or a blade server, or as more specific examples, an IBM System z10™ Business Class mainframe or a HP ProLiant ML™ server. Yet another example, the second device 106 can be a particularized machine, such as a portable computing device, a thin client, a notebook, a netbook, a smartphone, personal digital assistant, or a cellular phone, and as specific examples, an Apple iPhone™, Palm Centro™, or Moto Q Global™.

For illustrative purposes, the navigation system 100 is described with the second device 106 as a non-mobile computing device, although it is understood that the second device 106 can be different types of computing devices. For example, the second device 106 can also be a mobile computing device, such as notebook computer, another client device, or a different type of client device. The second device 106 can be a standalone device, or can be incorporated with a vehicle, for example a car, truck, bus, or train.

Also for illustrative purposes, the navigation system 100 is shown with the second device 106 and the first device 102 as end points of the communication path 104, although it is understood that the navigation system 100 can have a different partition between the first device 102, the second device 106, and the communication path 104. For example, the first device 102, the second device 106, or a combination thereof can also function as part of the communication path 104.

The communication path 104 can be a variety of networks. For example, the communication path 104 can include wireless communication, wired communication, optical, ultrasonic, or the combination thereof. Satellite communication, cellular communication, Bluetooth, Infrared Data Association standard (IrDA), wireless fidelity (WiFi), and worldwide interoperability for microwave access (WiMAX) are examples of wireless communication that can be included in the communication path 104. Ethernet, digital subscriber line (DSL), fiber to the home (FTTH), and plain old telephone service (POTS) are examples of wired communication that can be included in the communication path 104.

Further, the communication path 104 can traverse a number of network topologies and distances. For example, the communication path 104 can include direct connection, personal area network (PAN), local area network (LAN), metropolitan area network (MAN), wide area network (WAN) or any combination thereof.

Figure 2:
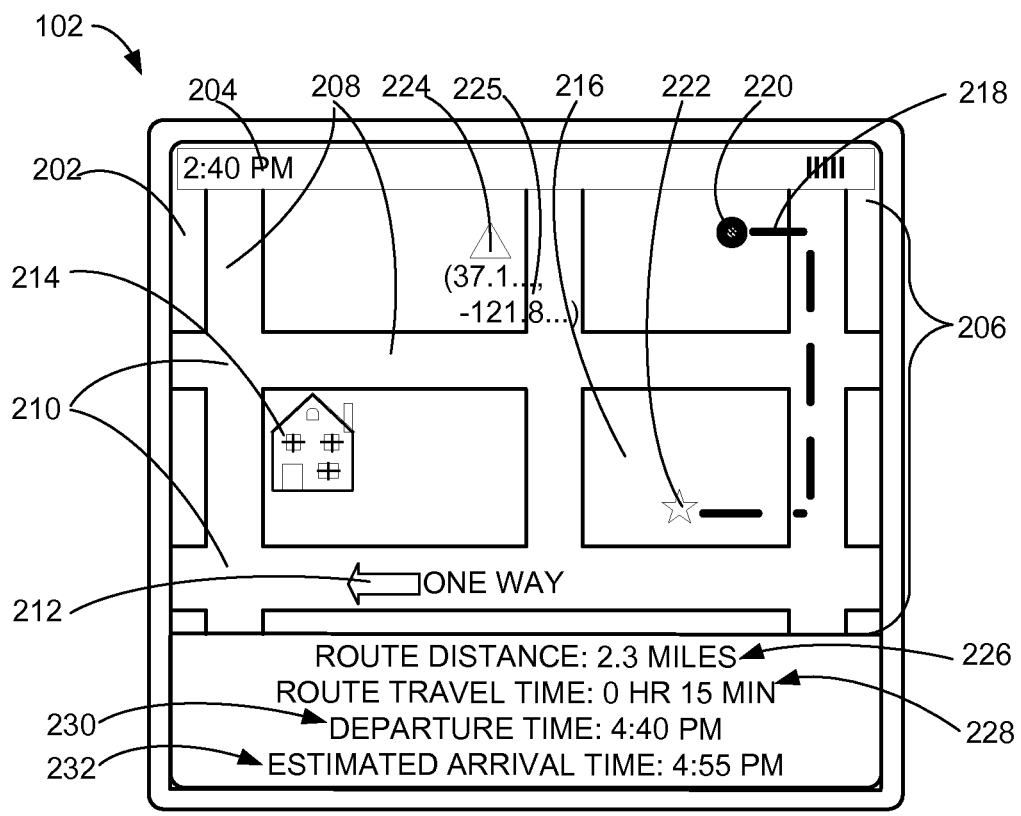
FIG. 2 is a first example of a display interface of the first device.

Referring now to FIG. 2, therein is shown a first example of a display interface 202 of the first device 102. The display interface 202 can show a current time 204 or a map 206.

The current time 204 is the present instant in time, represented using a known convention. The current time 204 can be represented using year, month, day, day of the week, hour, minute, second, fractional second, or combination thereof. For example, the current time can be March 3, 2010 13:12:34.5 or 3/3/10 1:12 pm Wednesday.

The map 206 is a representation of a geographic area. For example, the map 206 can represent a layout of a city visually or represent a city block with a series of written or audible coordinates, such as GPS coordinates or longitude and latitude, of entities that make up the city block. The map 206 can include a path 208, a node 210, a path regulation 212, a map entity 214, an enclosed block 216, or combination thereof.

The path 208 is a geographic area designated for travel. For example, the path 208 can be air route, road segment, pedestrian walkway, or hiking trail. The node 210 is an area on the path 208 that allows for a traveler, not shown, to change the direction of travel. For example, the node 210 can be an intersection, a high way entrance or exit, or where multiple trails intersect.

The path regulation 212 is defined as rules governing the travel of a particular location on the path 208 or the node 210. For example, the path regulation 212 can be one way, no right turn on red, speed limit, or inbound route.

The map entity 214 is a landmark or location on the map 206. For example, the map entity 214 can be a building, a house, a mountain, a store, a school, or a port. The map entity 214 can take up a portion of the enclosed block 216 or the enclosed block 216 in entirety. The enclosed block 216 is a geographic area sectioned or divided. For example, the enclosed block 216 can be a city block divided by roads or property lots divided by fences or property boarders.

The display interface 202 can overlay a vehicle travel route 218, having a starting point 220 and a destination 222, on the map 206. The vehicle travel route 218 is a route a vehicle can traverse to get from the starting point 220 to the destination 222. The starting point 220 is a location where a vehicle can start travelling. The destination 222 is a location where a vehicle is designated to finish travelling.

The vehicle travel route 218 can be overlaid by highlighting the starting point 220, the destination 222, and the path 208 connecting the two while displaying the vehicle travel route 218. The vehicle travel route 218 can also be overlaid by connecting the starting point 220 and the destination 222 with a line displayed over the path 208 while displaying the vehicle travel route 218.

The starting point 220 and the destination 222 can be a structure, such as a house or a tower, a location within a structure, such as a designated seat in a stadium or a specific store in a shopping center. The starting point 220 and the destination 222 can also be a landmark, such as a mountain or a waterfall, or a user-named location, such as home or work.

A current location 224 is a physical location 225 of the first device 102 in relation to the map 206. The current location 224 can be displayed on the map 206 if the first device 102 is located in a geographic area represented by the map 206.

The current location 224 can be not displayed or represented as being off the map 206 if the first device 102 is located in a geographic area not represented by the map 206. The details of selecting the starting point 220 and the destination 222, and calculating the vehicle travel route 218 will be discussed below.

The display interface 202 can also display a route distance 226, a route travel time 228, a departure time 230, an estimated arrival time 232, or combination thereof. The route distance 226 is the length or the total distance of the vehicle travel route 218. The details of calculating the route distance 226 will be discussed below.

The route travel time 228 is the amount of time needed for traversing the vehicle travel route 218. The departure time 230 is the time selected for departing from the starting point 220 to traverse the vehicle travel route 218. The departure time 230 can be the current time 204 if the traveler departs right away.

The estimated arrival time 232 is when the traveler should arrive at the destination 222. The details of calculating the route travel time 228 and the estimated arrival time 232, and the details of selecting the departure time 230 will be discussed below.

Figure 3:
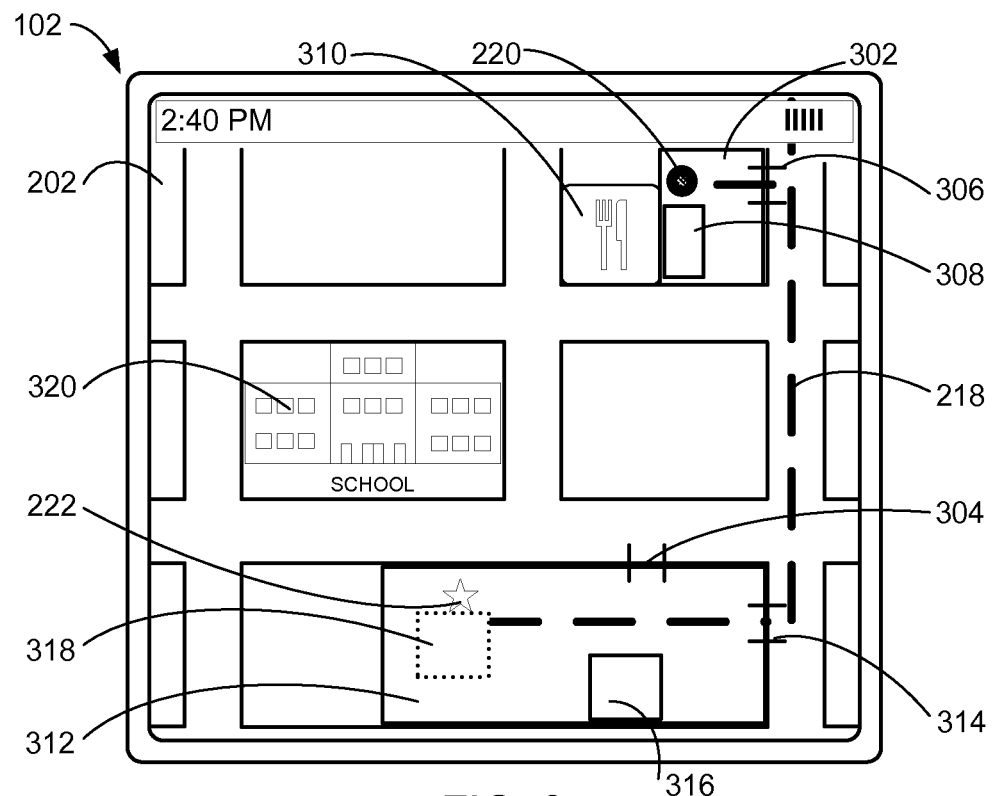
FIG. 3 is a second example of the display interface of the first device.

Referring now to FIG. 3, therein is shown a second example of the display interface 202 of the first device 102. The display interface can show a start lot 302, access ways 304, a preferred exit-point 306, an origin-lot hazard 308, and a first route-hazard 310.

The start lot 302 is the enclosed block 216 of FIG. 2 that contains the starting point 220. For example, the start lot 302 can be the residential lot of a house or a shopping center and its parking lot containing a store as the starting point 220. The details of identifying the start lot 302 will be discussed below.

The start lot 302 can have the access ways 304. The access ways 304 are the geographic areas where vehicles can enter and exit the start lot 302. For example, the access ways 304 can be parking lot entrances or exits or airport runways. The preferred exit-point 306 is the access ways 304 the traveler or the navigation system 100 can choose for exiting the start lot 302 in traversing the vehicle travel route 218. The details of selecting the preferred exit-point 306 will be discussed below.

The origin-lot hazard 308 is the map entity 214 of FIG. 2 within the start lot 302 that creates potential a travel hazard for a traveler. The traveler should be made aware of the origin-lot hazard 308 when traveling through the start lot 302. For example, the origin-lot hazard 308 can be a day care, which may require the traveler to look for children when leaving the start lot 302. Also, for example, the origin-lot hazard 308 can be a movie theater, which may require the traveler to navigate around large number of pedestrians and cars leaving and entering parking spots at certain times. The details of identifying the origin-lot hazard 308 will be discussed below.

The first route-hazard 310 is the map entity 214 outside and geographically proximate to the start lot 302 that creates a travel hazard for a traveler. The traveler should be made aware of the first route-hazard 310 when traversing the vehicle travel route 218. For example, the first route-hazard 310 can be sea-plane landing zone, requiring the boat captains to look out for approaching planes when leaving the dock. Also, for example, the first route-hazard 310 can be a popular restaurant that causes large amounts of vehicle and pedestrian traffic at certain times of the day. The details of identifying the first route-hazard 310 will be discussed below.

The display interface can also show a destination lot 312, a preferred entry point 314, a destination-lot hazard 316, a parking stall 318, and a last route-hazard 320. The destination lot 312 is the enclosed block 216 that includes the destination 222. For example, the destination lot 312 can be an industrial complex and the associated parking lot, containing an office as the destination 222. Also, for example, the destination lot 312 can be a wharf or a harbor containing a boat dock as the destination 222. The details of identifying the destination lot 312 will be discussed below.

The destination lot 312 can also have the access ways 304 for entering and exiting the destination lot 312. The preferred entry point 314 is one of the access ways 304 the traveler can use to enter the destination lot 312 in traversing the vehicle travel route 218. The details of selecting the preferred entry point 314 will be discussed below.

The destination-lot hazard 316 is the map entity 214 within the destination lot 312 that creates a travel hazard for a traveler. The traveler should be made aware of the destination-lot hazard 316 when traveling through the destination lot 312. For example, the destination-lot hazard 316 can be a building under construction, which may increase the likelihood of damage to the vehicle. Also, for example, the destination-lot hazard 316 can be a rock or a buoy in the wharf that the vehicle must navigate around. The details of identifying the destination-lot hazard 316 will be discussed below.

The parking stall 318 is the vehicle storage area closest to the destination 222. For example, the parking stall 318 can be the open parking area closest to the assigned seats at a baseball game or the airplane stop area in front of the desired gate. The details of identifying the parking stall 318 will be discussed below.

The last route-hazard 320 is the map entity 214 geographically proximate the destination 222 that the traveler should be aware of when traversing the vehicle travel route 218. For example, the last route-hazard 320 can be a second airport within 25 miles of a first airport serving as the destination 222, requiring the pilot to pay attention to the correct flight tower. Also, for example, the last route-hazard 320 can be a school, requiring the traveler to observe different speed limits during school hours. The details of identifying the last route-hazard 320 will be discussed below.

Figure 4:
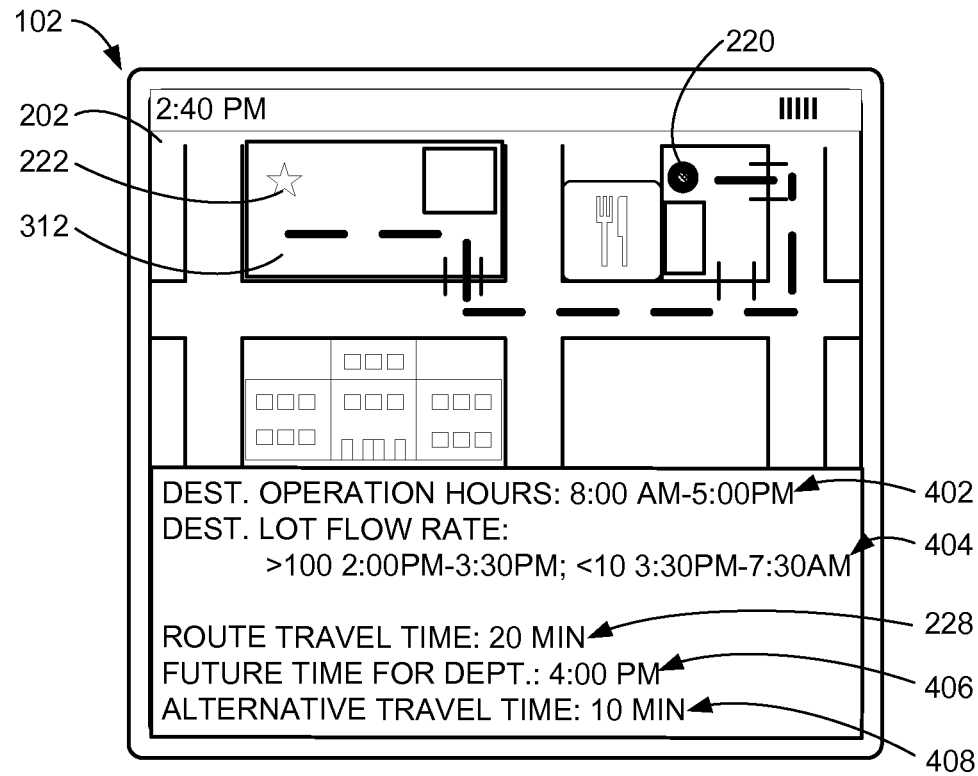
FIG. 4 is a third example of the display interface of the first device.

Referring now to FIG. 4, therein is shown a third example of the display interface 202 of the first device 102. The display interface 202 can show operation hours 402, a traffic flow rate 404, a suggested leaving time 406, a future travel duration 408, or a combination thereof.

The operation hours 402 are the times when the destination 222 is open for receiving visitors or for doing business. For example, the operation hours 402 can be reasonable hours for visiting a residence, such as between 10:00 am to 9:00 pm, or store business hours, such as 10:00 am to 5:00 pm. The details of identifying the operation hours 402 will be discussed below.

The traffic flow rate 404 is defined as the amount of vehicles and pedestrians entering and leaving the destination lot 312 over a certain time interval, such as each hour or lunch period. For example, the traffic flow rate 404 can be the actual number of vehicles and pedestrians entering and leaving the destination lot 312 each hour of a calendar day, averaged with same day of the week, month, year, or a combination thereof.

Also, for example, the traffic flow rate 404 can be represented by designated levels, such as heavy traffic or minimal traffic, or by percentage of a known capacity, such as the percentage of occupied parking spots or percentage of occupancy across all entities in the destination lot 312. Such representation can be specified for known time periods, such as lunch hours or 30 minutes before and after movie start and finish time. The details of identifying the traffic flow rate 404 will be discussed below.

The suggested leaving time 406 is a time later than the departure time 230 of FIG. 2, when the traveler should have better travel conditions for traversing through the destination lot 312, if the traveler departs at the suggested leaving time 406 rather than the departure time 230. Better travel conditions can be an improvement in the traffic flow rate 404 or less hazards.

For example, if the vehicle travel route 218 of FIG. 2 for travelling from home to a bank, the suggested leaving time 406 can be 10:30 am rather than leaving at 9:00 am. The traveler can avoid the people arriving for work at 9:00 am in the destination lot 312 or leaving and arriving for lunch starting at 11:30 am by departing at the suggested leaving time 406. Also, for example, the suggested leaving time 406 can be this Thursday if the destination lot 312 has a construction project finishing this Wednesday. The details of calculating the suggested leaving time 406 will be discussed below.

The future travel duration 408 is the time needed to traverse the vehicle travel route 218 of FIG. 2 when the traveler departs at the suggested leaving time 406. The future travel duration 408 can be calculated similar to the route travel time 228 of FIG. 2. The details of calculating the future travel duration 408 will be discussed below.

Figure 5:
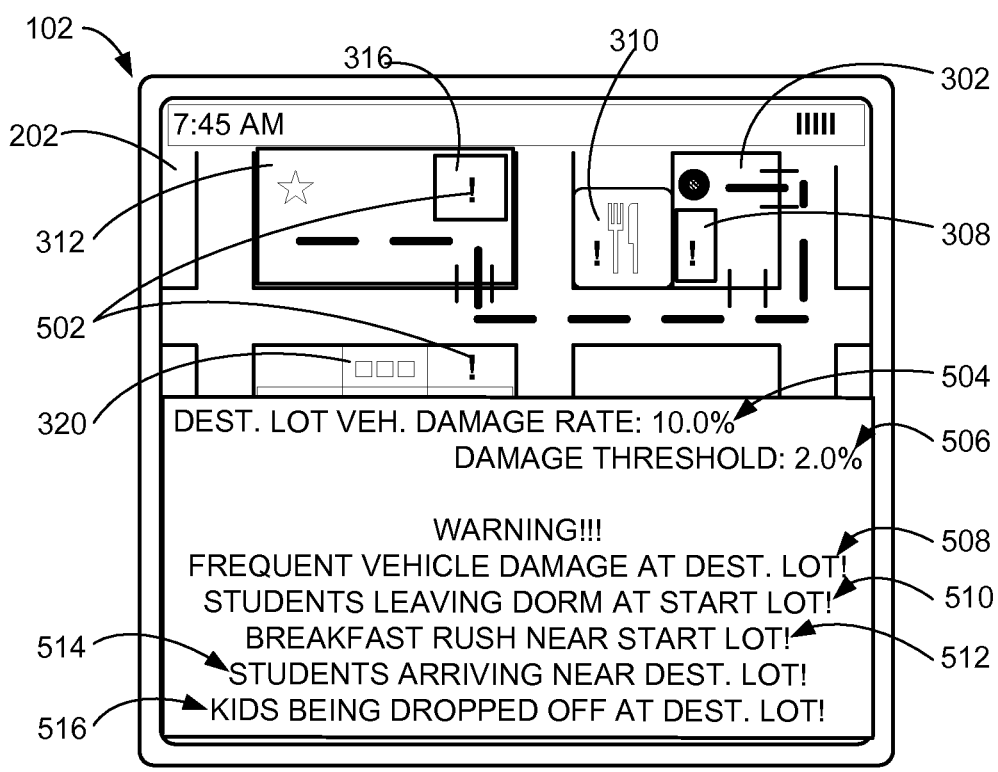
FIG. 5 is a fourth example of the display interface of the first device.

Referring now to FIG. 5, therein is shown a fourth example of the display interface 202 of the first device 102. The display interface 202 can show a cautionary attention 502, a vehicle damage rate 504, a damage threshold 506, a damage warning 508, a departure warning 510, a route start warning 512, an arrival warning 516, an approach warning 514, or combination thereof.

The cautionary attention 502 is a notice to the traveler of any situation or entity that requires the traveler to be cautious. For example, the cautionary attention 502 can be children playing in the area, accident up ahead, or delays on the tarmac. Also, for example, the cautionary attention 502 can be anything that requires traveler to be cautious, such as reducing speed, proactively looking for kids or dangers, or increase in pedestrian traffic in the vicinity.

The vehicle damage rate 504 is a likelihood of a vehicle being damaged in the destination lot 312. The vehicle damage rate 504 can be represented using a percentage, number of reported or known damages within a given period of time, or through a known scale, such as low-medium-high or a numeric scale. The damage done to the vehicle can include collision, vandalism, theft, number of hazards identified within the destination lot 312, or combination thereof.

For example, the vehicle damage rate 504 can be HIGH in a low-medium-high scale if the lot has more collisions and thefts than the surrounding areas and other comparable areas. Also, for example, the vehicle damage rate 504 can be 5 if there have been three occurrences of people keying a car during the past months and two large pot holes, all within the destination lot 312. The details of calculating the vehicle damage rate 504 will be discussed below.

The damage threshold 506 is the point at which the damage warning 508 is given to notify the traveler of the vehicle damage rate 504. The damage warning 508 can be displayed when the vehicle damage rate 504 meets or exceeds the damage threshold 506. For example, the damage warning 508 will be displayed if the vehicle damage rate 504 is 4 or higher in a 1-10 scale, where 1 denotes the least likely chance of the vehicle receiving damage, and the damage threshold 506 is 4.

The damage warning 508 is an alert and notification to the traveler of the likelihood of damage to the vehicle when the vehicle is in the destination lot 312. The damage warning 508 can be an auditory cue, such as a sound or a spoken word, or a visual notification, such as a written character or an image that can alert the traveler of the likelihood of damage. The details of setting the damage threshold 506, comparing the damage threshold 506 to the vehicle damage rate 504, and displaying the damage warning 508 will be discussed below.

The departure warning 510 is a way of alerting and notifying the traveler of the entity or situation the traveler needs to be aware of as they exit the start lot 302. The departure warning 510 can be the cautionary attention 502 that is at, near to, or associated with the origin-lot hazard 308. For example, the departure warning 510 can be displayed if the departure time 230 of FIG. 2 is near the start time for the first class at a nearby university, when there is increased pedestrian traffic coming from the student dorm and through the start lot 302.

The route start warning 512 is a way of alerting and notifying the traveler of the entity or situation the traveler needs to be aware of as they start moving away from the start lot 302. The route start warning 512 can be the cautionary attention 502 that is at, near to, or associated with the first route-hazard 310. For example, the route start warning 512 can be displayed if the departure time 230 is near breakfast time, when there is increased vehicle and pedestrian traffic near the cafeteria that is adjacent to the start lot 302.

The approach warning 514 is a way of alerting and notifying the traveler of the entity or situation the traveler needs to be aware of as they start moving towards the destination lot 312. The approach warning 514 can be the cautionary attention 502 that is at, near to, or associated with the last route-hazard 320. For example, the approach warning 514 can be displayed if the departure time 230 is near the start time for the first class at a university nearby the destination lot 312.

The arrival warning 516 is a way of alerting and notifying the traveler of the entity or situation the traveler needs to be aware of as they enter the destination lot 312. The arrival warning 516 can be the cautionary attention 502 that is at, near to, or associated with the destination-lot hazard 316. For example, the arrival warning 516 can be displayed if the departure time 230 is near the time when the parents drop off their kids at a daycare that is in the destination lot 312, thereby having increased traffic flow and children in the destination lot 312.

The departure warning 510, the route start warning 512, the approach warning 514, and the arrival warning 516 can each be an auditory cue, such as a sound or a spoken word, or a visual notification, such as a written character or an image that can alert the traveler. The details of displaying the departure warning 510, the route start warning 512, the approach warning 514, and the arrival warning 516 will be discussed below.

Figure 6:
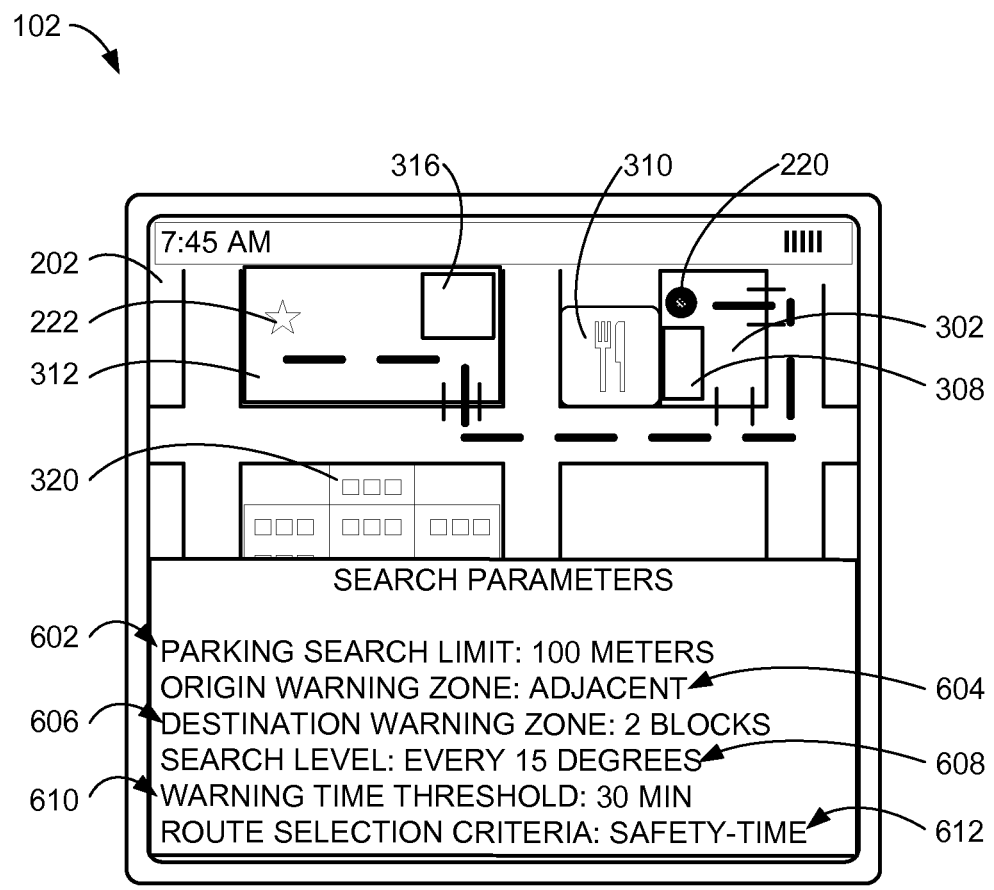
FIG. 6 is a fifth example of the display interface of the first device.

Referring now to FIG. 6, therein is shown a fifth example of the display interface 202 of the first device 102. The display interface 202 can show a parking search limit 602, an origin warning zone 604, a destination warning zone 606, a search level 608, a warning time threshold 610 and a route selection criteria 612.

The parking search limit 602 is the furthest distance the parking stall 318 of FIG. 3 can be away from the destination 222. The parking search limit 602 can be the limit on the distance that can be used in searching for the parking stall 318. For example, the parking search limit 602 can be specified as 100 meters, within the same lot, or two city blocks. The search for the parking stall 318 will be limited to 100 meters, within the same lot, or within two city blocks.

The origin warning zone 604 is the distance limit away from the starting point 220 for considering departure related warnings. The origin warning zone 604 can be the limit on the distance from the starting point 220 that can be used in searching for the route start warning 512 of FIG. 5. For example, the origin warning zone 604 can be specified as adjacent entity. The search for the cautionary attention 502 of FIG. 5 will be limited to originating from the map entity 214 of FIG. 214 that is adjacent to the starting point 220. Also, for example, the search can be limited to distance, such as within 100 meters or two city blocks.

The destination warning zone 606 is the distance limit away from the destination 222 for considering arrival related warnings. The destination warning zone 606 can be the limit on the distance from the destination 222 that can be used in searching for the approach warning 514 of FIG. 5. For example, the destination warning zone 606 can be specified as two city blocks or 100 meters. The search for the cautionary attention 502 will be limited to within two city blocks or 100 meters in every direction away from the destination 222.

The search level 608 is the limit on the iteration for various searches. The search level 608 can define the number of times a search can be conducted in finding a given object. For example, the search level 608 can specify that a search will be done every 15 degrees in a radial pattern, every 5 feet in a parallel linear pattern, or 20 repetitions in even increments over a given area.

The warning time threshold 610 is the proximity limit in time placed on warning the user. The warning time threshold 610 can limit the departure warning 510 of FIG. 5, the route start warning 512, or a combination thereof to be within a certain time period before or after the departure time 230 of FIG. 2. The warning time threshold 610 can also limit the approach warning 514, the arrival warning 516 of FIG. 5, or a combination thereof to be within a certain time period or after the estimated arrival time 232 of FIG. 2.

For example, if the warning time threshold 610 is defined as 30 minutes, the route start warning 512 and the departure warning 510 can be limited to the cautionary attention 502 occurring 30 minutes before or after the departure time 230. Also, for example, the approach warning 514 and the arrival warning 516 can be limited to the cautionary attention 502 occurring 30 minutes before or after the estimated arrival time 232.

The route selection criteria 612 are the desired characteristics used for selecting the vehicle travel route 218 of FIG. 2. The route selection criteria 612 can include an ordered set of criteria used for selecting the access ways 304 of FIG. 3 or the next segment of the path 208 of FIG. 2 at the node 210 of FIG. 2. For example, the route selection criteria 612 can include characteristics such as availability, path regulation, time, distance, safety, preference, or combination thereof.

Whenever the navigation system 100 uses the route selection criteria 612 to choose, the choice that satisfies the first item in the route selection criteria 612 can be selected. If all of the choices satisfy the first item, the navigation system 100 can use the next item in the route selection criteria. The navigation system 100 can repeat such parsing algorithm until one of the choices is chosen or all of the route selection criteria 612 are used.

For example, if the route selection criteria 612 are defined as time then distance, the navigation system 100 can choose the direction that will ultimately yield the shortest travel time. However, if going straight and turning right at a given intersection yields the same amount of travel time, the navigation system 100 can choose the direction that will ultimately yield the shortest travel distance. The route selection criteria 612 can have a default choice, such as go right or first listed choice, for when all of the available choices are equal under the route selection criteria 612.

The route selection criteria 612 can include different sets of criteria for selecting the preferred exit-point 306 of FIG. 3, the path 208 of FIG. 2, and the preferred entry point 314 of FIG. 3. The route selection criteria 612 can be determined and ordered by the navigation system 100, the software manufacturer, the user, or combination thereof. The use of the route selection criteria 612 will be discussed in detail below.

Figure 7:
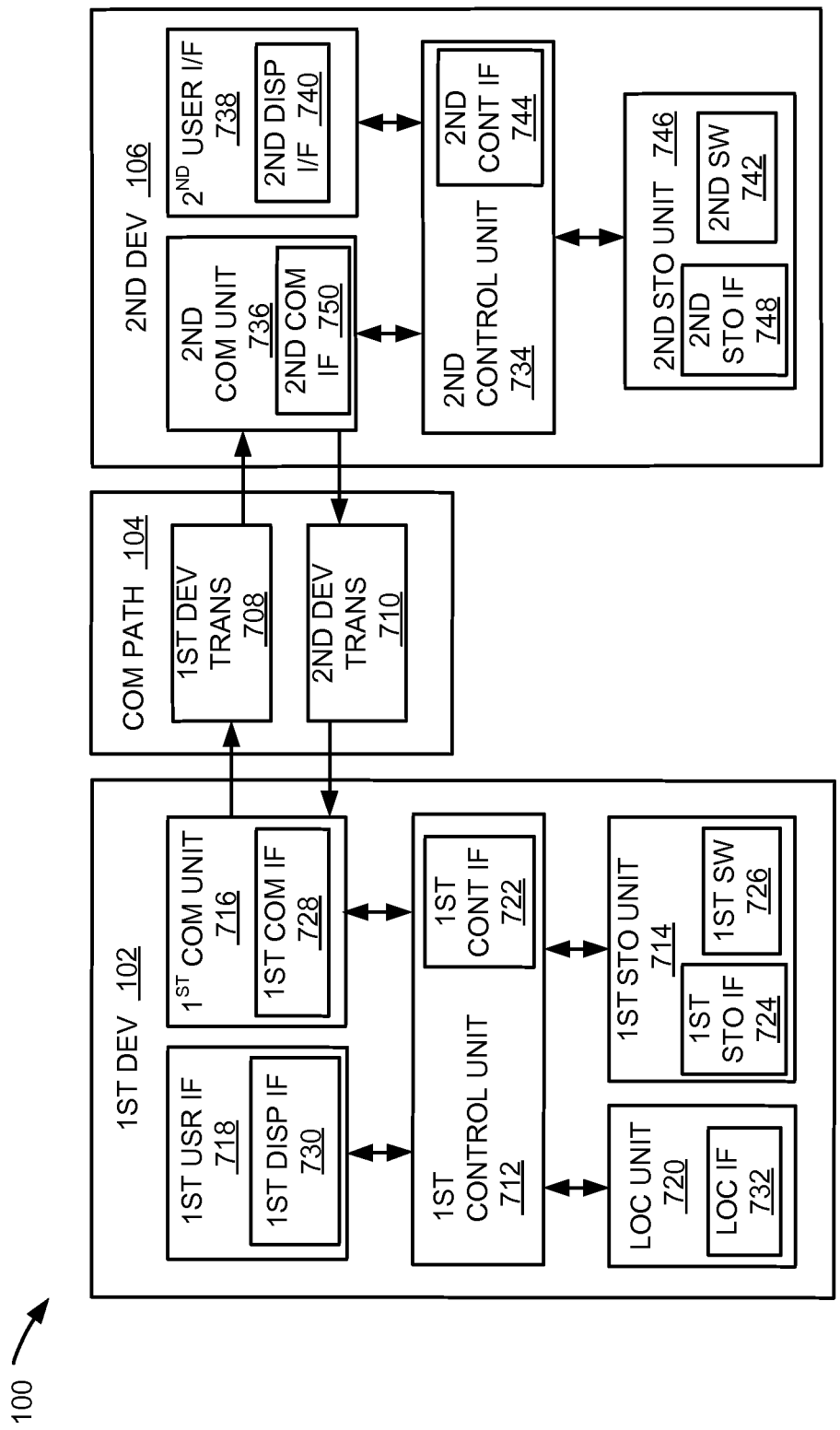
FIG. 7 is an exemplary block diagram of the navigation system.

Referring now to FIG. 7, therein is shown an exemplary block diagram of the navigation system 100. The navigation system 100 can include the first device 102, the communication path 104, and the second device 106.

The first device 102 can communicate with the second device 106 over the communication path 104. For example, the first device 102, the communication path 104, and the second device 106 can be the first device 102 of FIG. 1, the communication path 104 of FIG. 1, and the second device 106 of FIG. 1, respectively. The screen shot shown on the display interface 202 described in FIG. 2 can represent the screen shot for the navigation system 100.

The first device 102 can send information in a first device transmission 708 over the communication path 104 to the second device 106. The second device 106 can send information in a second device transmission 710 over the communication path 104 to the first device 102.

For illustrative purposes, the navigation system 100 is shown with the first device 102 as a client device, although it is understood that the navigation system 100 can have the first device 102 as a different type of device. For example, the first device 102 can be a server.

Also for illustrative purposes, the navigation system 100 is shown with the second device 106 as a server, although it is understood that the navigation system 100 can have the second device 106 as a different type of device. For example, the second device 106 can be a client device.

For brevity of description in this embodiment of the present invention, the first device 102 will be described as a client device and the second device 106 will be described as a server device. The present invention is not limited to this selection for the type of devices. The selection is an example of the present invention.

The first device 102 can include a first control unit 712, a first storage unit 714, a first communication unit 716, a first user interface 718, and a location unit 720. The first device 102 can be similarly described by the first device 102. The first control unit 712 can include a first control interface 722. The first storage unit 714 can include a first storage interface 724.

The first control unit 712 can execute a first software 726 to provide the intelligence of the navigation system 100. The first control unit 712 can operate the first user interface 718 to display information generated by the navigation system 100. The first control unit 712 can also execute the first software 726 for the other functions of the navigation system 100, including receiving location information from the location unit 720. The first control unit 712 can further execute the first software 726 for interaction with the communication path 104 of FIG. 1 via the first communication unit 716.

The first control unit 712 can be implemented in a number of different manners. For example, the first control unit 712 can be a processor, an embedded processor, a microprocessor, a hardware control logic, a hardware finite state machine (FSM), a digital signal processor (DSP), or a combination thereof.

The first control unit 712 can include a first control interface 722. The first control interface 722 can be used for communication between the first control unit 712 and other functional units in the first device 102. The first control interface 722 can also be used for communication that is external to the first device 102.

The first control interface 722 can receive information from the other functional units or from external sources, or can transmit information to the other functional units or to external destinations. The external sources and the external destinations refer to sources and destinations external to the first device 102.

The first control interface 722 can be implemented in different ways and can include different implementations depending on which functional units or external units are being interfaced with the first control interface 722. For example, the first control interface 722 can be implemented with a pressure sensor, an inertial sensor, a microelectromechanical system (MEMS), optical circuitry, waveguides, wireless circuitry, wireline circuitry, or a combination thereof.

The first storage unit 714 can store a first software 726. The first storage unit 714 can also store the relevant information, such as advertisements, points of interest (POI), navigation routing entries, or any combination thereof.

The first storage unit 714 can be a volatile memory, a nonvolatile memory, an internal memory, an external memory, or a combination thereof. For example, the first storage unit 714 can be a nonvolatile storage such as non-volatile random access memory (NVRAM), Flash memory, disk storage, or a volatile storage such as static random access memory (SRAM).

The first storage unit 714 can include a first storage interface 724. The first storage interface 724 can be used for communication between the location unit 720 and other functional units in the first device 102. The first storage interface 724 can also be used for communication that is external to the first device 102.

The first storage interface 724 can receive information from the other functional units or from external sources, or can transmit information to the other functional units or to external destinations. The external sources and the external destinations refer to sources and destinations external to the first device 102.

The first storage interface 724 can include different implementations depending on which functional units or external units are being interfaced with the first storage unit 714. The first storage interface 724 can be implemented with technologies and techniques similar to the implementation of the first control interface 722.

The first communication unit 716 can enable external communication to and from the first device 102. For example, the first communication unit 716 can permit the first device 102 to communicate with the second device 106 of FIG. 1, an attachment, such as a peripheral device or a computer desktop, and the communication path 104.

The first communication unit 716 can also function as a communication hub allowing the first device 102 to function as part of the communication path 104 and not limited to be an end point or terminal unit to the communication path 104. The first communication unit 716 can include active and passive components, such as microelectronics or an antenna, for interaction with the communication path 104.

The first communication unit 716 can include a first communication interface 728. The first communication interface 728 can be used for communication between the first communication unit 716 and other functional units in the first device 102. The first communication interface 728 can receive information from the other functional units or can transmit information to the other functional units.

The first communication interface 728 can include different implementations depending on which functional units are being interfaced with the first communication unit 716. The first communication interface 728 can be implemented with technologies and techniques similar to the implementation of the first control interface 722.

The first user interface 718 allows a user (not shown) to interface and interact with the first device 102. The first user interface 718 can include an input device and an output device. Examples of the input device of the first user interface 718 can include a keypad, a touchpad, soft-keys, a keyboard, a microphone, or any combination thereof to provide data and communication inputs.

The first user interface 718 can include a first display interface 730. Examples of the output device of the first user interface 718 can include the first display interface 730. The first display interface 730 can include a display, a projector, a video screen, a speaker, or any combination thereof.

The location unit 720 can generate location information, current heading, and current speed of the first device 102, as examples. The location unit 720 can be implemented in many ways. For example, the location unit 720 can function as at least a part of a global positioning system (GPS), an inertial navigation system, a cellular-tower location system, a pressure location system, or any combination thereof.

The location unit 720 can include a location interface 732. The location interface 732 can be used for communication between the location unit 720 and other functional units in the first device 102. The location interface 732 can also be used for communication that is external to the first device 102.

The location interface 732 can receive information from the other functional units or from external sources, or can transmit information to the other functional units or to external destinations. The external sources and the external destinations refer to sources and destinations external to the first device 102.

The location interface 732 can include different implementations depending on which functional units or external units are being interfaced with the location unit 720. The location interface 732 can be implemented with technologies and techniques similar to the implementation of the first control unit 712.

For illustrative purposes, the first device 102 is shown with the partition having the first control unit 712, the first storage unit 714, the first user interface 718, the first communication unit 716, and the location unit 720 although it is understood that the navigation system 100 can have a different partition. For example, the first software 726 can be partitioned differently such that some or all of its function can be in the first control unit 712, the location unit 720, and the first communication unit 716. Also, the first device 102 can include other functional units not shown in FIG. 7 for clarity.

The functional units in the first device 102 can work individually and independently of the other functional units. The first device 102 can work individually and independently from the second device 106 and the communication path 104.

The second device 106 can be optimized for implementing the present invention in a multiple device embodiment with the first device 102. The second device 106 can provide the additional or higher performance processing power compared to the first device 102. The second device 106 can include a second control unit 734, a second communication unit 736, and a second user interface 738.

The second user interface 738 allows a user (not shown) to interface and interact with the second device 106. The second user interface 738 can include an input device and an output device. Examples of the input device of the second user interface 738 can include a keypad, a touchpad, soft-keys, a keyboard, a microphone, or any combination thereof to provide data and communication inputs. Examples of the output device of the second user interface 738 can include a second display interface 740. The second display interface 740 can include a display, a projector, a video screen, a speaker, or any combination thereof.

The second control unit 734 can execute a second software 742 to provide the intelligence of the second device 106 of the navigation system 100. The second software 742 can operate in conjunction with the first software 726. The second control unit 734 can provide additional performance compared to the first control unit 712.

The second control unit 734 can operate the second user interface 738 to display information. The second control unit 734 can also execute the second software 742 for the other functions of the navigation system 100, including operating the second communication unit 736 to communicate with the first device 102 over the communication path 104.

The second control unit 734 can be implemented in a number of different manners. For example, the second control unit 734 can be a processor, an embedded processor, a microprocessor, a hardware control logic, a hardware finite state machine (FSM), a digital signal processor (DSP), or a combination thereof.

The second control unit 734 can include a second controller interface 744. The second controller interface 744 can be used for communication between the second control unit 734 and other functional units in the second device 106. The second controller interface 744 can also be used for communication that is external to the second device 106.

The second controller interface 744 can receive information from the other functional units or from external sources, or can transmit information to the other functional units or to external destinations. The external sources and the external destinations refer to sources and destinations external to the second device 106.

The second controller interface 744 can be implemented in different ways and can include different implementations depending on which functional units or external units are being interfaced with the second controller interface 744. For example, the second controller interface 744 can be implemented with a pressure sensor, an inertial sensor, a microelectromechanical system (MEMS), optical circuitry, waveguides, wireless circuitry, wireline circuitry, or a combination thereof.

A second storage unit 746 can store the second software 742. The second storage unit 746 can also store the relevant information, such as advertisements, points of interest (POI), navigation routing entries, or any combination thereof. The second storage unit 746 can be sized to provide the additional storage capacity to supplement the first storage unit 714.

For illustrative purposes, the second storage unit 746 is shown as a single element, although it is understood that the second storage unit 746 can be a distribution of storage elements. Also for illustrative purposes, the navigation system 100 is shown with the second storage unit 746 as a single hierarchy storage system, although it is understood that the navigation system 100 can have the second storage unit 746 in a different configuration. For example, the second storage unit 746 can be formed with different storage technologies forming a memory hierarchal system including different levels of caching, main memory, rotating media, or off-line storage.

The second storage unit 746 can be a volatile memory, a nonvolatile memory, an internal memory, an external memory, or a combination thereof. For example, the second storage unit 746 can be a nonvolatile storage such as nonvolatile random access memory (NVRAM), Flash memory, disk storage, or a volatile storage such as static random access memory (SRAM).

The second storage unit 746 can include a second storage interface 748. The second storage interface 748 can be used for communication between the location unit 720 and other functional units in the second device 106. The second storage interface 748 can also be used for communication that is external to the second device 106.

The second storage interface 748 can receive information from the other functional units or from external sources, or can transmit information to the other functional units or to external destinations. The external sources and the external destinations refer to sources and destinations external to the second device 106.

The second storage interface 748 can include different implementations depending on which functional units or external units are being interfaced with the second storage unit 746. The second storage interface 748 can be implemented with technologies and techniques similar to the implementation of the second controller interface 744.

The second communication unit 736 can enable external communication to and from the second device 106. For example, the second communication unit 736 can permit the second device 106 to communicate with the first device 102 over the communication path 104.

The second communication unit 736 can also function as a communication hub allowing the second device 106 to function as part of the communication path 104 and not limited to be an end point or terminal unit to the communication path 104. The second communication unit 736 can include active and passive components, such as microelectronics or an antenna, for interaction with the communication path 104.

The second communication unit 736 can include a second communication interface 750. The second communication interface 750 can be used for communication between the second communication unit 736 and other functional units in the second device 106. The second communication interface 750 can receive information from the other functional units or can transmit information to the other functional units.

The second communication interface 750 can include different implementations depending on which functional units are being interfaced with the second communication unit 736. The second communication interface 750 can be implemented with technologies and techniques similar to the implementation of the second controller interface 744.

The first communication unit 716 can couple with the communication path 104 to send information to the second device 106 in the first device transmission 708. The second device 106 can receive information in the second communication unit 736 from the first device transmission 708 of the communication path 104.

The second communication unit 736 can couple with the communication path 104 to send information to the first device 102 in the second device transmission 710. The first device 102 can receive information in the first communication unit 716 from the second device transmission 710 of the communication path 104. The navigation system 100 can be executed by the first control unit 712, the second control unit 734, or a combination thereof.

For illustrative purposes, the second device 106 is shown with the partition having the second user interface 738, the second storage unit 746, the second control unit 734, and the second communication unit 736, although it is understood that the second device 106 can have a different partition. For example, the second software 742 can be partitioned differently such that some or all of its function can be in the second control unit 734 and the second communication unit 736. Also, the second device 106 can include other functional units not shown in FIG. 7 for clarity.

The functional units in the second device 106 can work individually and independently of the other functional units. The second device 106 can work individually and independently from the first device 102 and the communication path 104.

For illustrative purposes, the navigation system 100 is described by operation of the first device 102 and the second device 106. It is understood that the first device 102 and the second device 106 can operate any of the modules and functions of the navigation system 100. For example, the first device 102 is described to operate the location unit 720, although it is understood that the second device 106 can also operate the location unit 720.

Figure 8:
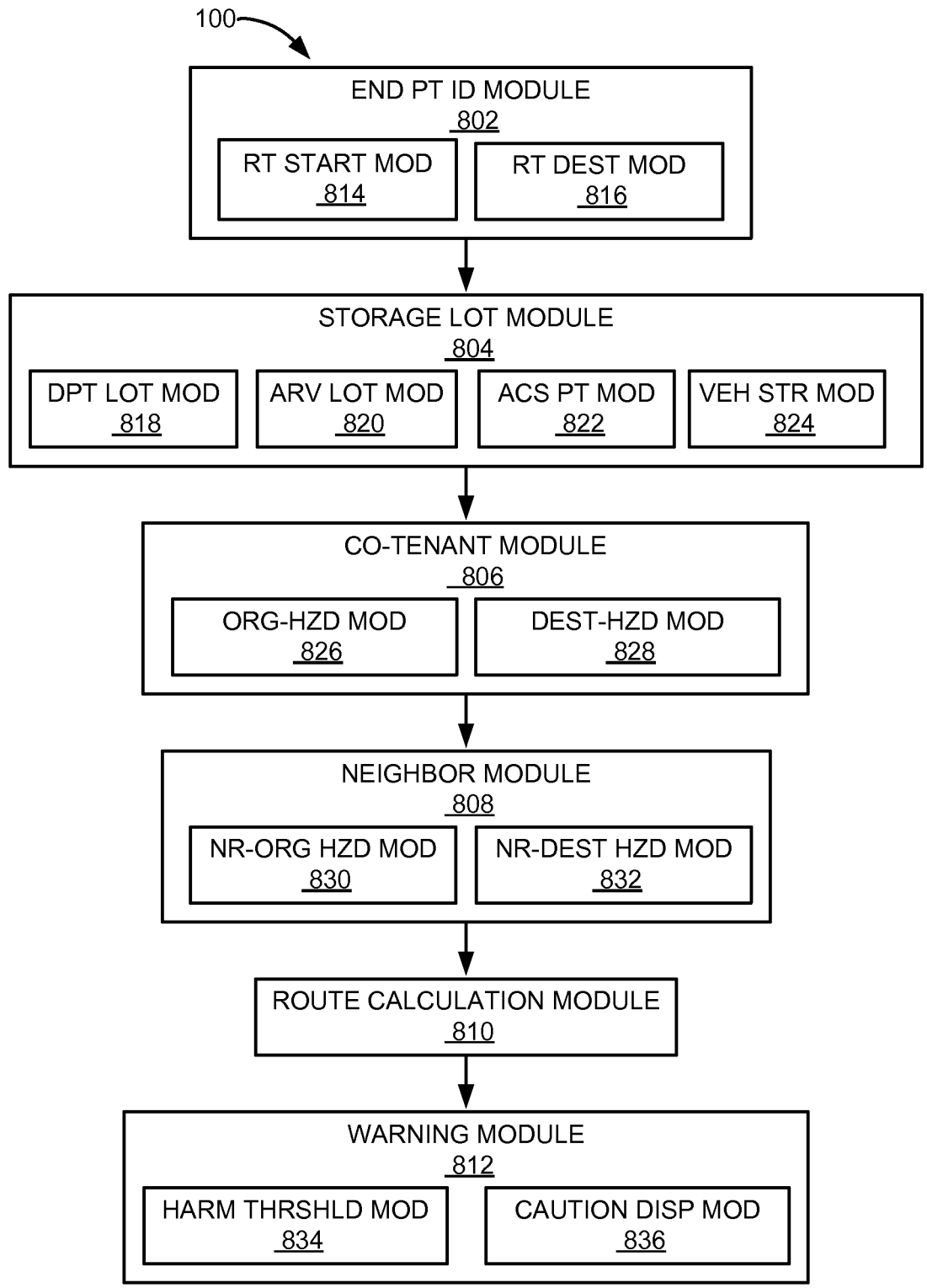
FIG. 8 is a control flow of the navigation system.

Referring now to FIG. 8, therein is shown a control flow of the navigation system 100. The navigation system 100 can include an endpoint identification module 802, a storage lot module 804, a co-tenant module 806, a neighbor module 808, a route calculation module 810, and a warning module 812.

The endpoint identification module 802 can be coupled to the storage lot module 804, which can be coupled to the co-tenant module 806. The co-tenant module 806 can be coupled to the neighbor module 808, which can be coupled to the route calculation module 810. The route calculation module 810 can be coupled to the warning module 812.

The purpose of the endpoint identification module 802 is to locate the beginning and the end of the vehicle travel route 218 of FIG. 2. The endpoint identification module 802 can locate the beginning and the end of the vehicle travel route 218 by selecting and locating the starting point 220 of FIG. 2 and the destination 222 of FIG. 2. The endpoint identification module 802 can include a route start module 814 and a route destination module 816.

The purpose of the route start module 814 is to locate the beginning of the vehicle travel route 218. The route start module 814 selects the starting point 220. The route start module 814 can select the starting point 220 by identifying the physical location 225 of FIG. 2 where the vehicle travel route 218 will start. The route start module 814 can select the starting point 220 using identification for the physical location 225.

The physical location 225 can be identified by an address, a set of coordinates, a name, or combination thereof. For example, the route start module 814 can select the address of the user's employer as the starting point 220 if the user needs to go to a meeting at the vendor's office. Also, for example, the route start module 814 can select the current location of the first device 102 of FIG. 7 using the coordinates, such as GPS coordinates or longitude and latitude, identified by the location unit 720 of FIG. 7.

The route start module 814 can use the second control unit 734 of FIG. 7, the second storage unit 746 of FIG. 7, or the location unit 720 to identify the physical location 225. The route start module 814 can use the first control unit 712 of FIG. 7 or the second control unit 734 to select the starting point 220.

The purpose of the route destination module 816 is to locate the destination 222 of the vehicle travel route 218. The route destination module 816 selects the destination 222. The route destination module 816 can select the destination 222 by identifying a different instance of the physical location 225 where the vehicle travel route 218 will end. The route destination module 816 can select the destination 222 using an identification for the different instance of the physical location 225.

For example, the route destination module 816 can select the node 210 of FIG. 2, such as Fourth and Broadway, as the destination 222. Also, for example, the route destination module 816 can select the destination 222 from a name, such as Madison Square Garden™ or home, or a category, such as a grocery store or a vehicle mechanic.

The route destination module 816 can use the second control unit 734 of FIG. 7 and the second storage unit 746 of FIG. 7, or the first control unit 712 of FIG. 7 and the first storage unit 714 of FIG. 7 to identify the different instance of the physical location 225. The route destination module 816 can use the first control unit 712 or the second control unit 734 to select the starting point 220.

The purpose of the storage lot module 804 is to find the details of the area associated with the starting point 220 and the destination 222, such as a parking lot or the property boundary. The storage lot module 804 can find the details of the area around the starting point 220 and the destination 222 by identifying the start lot 302 of FIG. 3 and the destination lot 312 of FIG. 3. The storage lot module 804 can include a departure lot module 818, an arrival lot module 820, an access point module 822, and a vehicle storage module 824.

The purpose of the departure lot module 818 is to find the details of the area around the starting point 220. The departure lot module 818 identifies the start lot 302 associated with the starting point 220. The departure lot module 818 can identify the start lot 302 by locating the boundary of the property lot where the starting point 220 is located or by locating associated areas, such as parking structures.

The departure lot module 818 can locate the boundary of the lot by identifying the address of the starting point 220 and searching the public record to find the property lot where the starting point 220 is located. The departure lot module 818 can identify the address of the starting point 220 from a list matching coordinates and location identifiers to an address.

The departure lot module 818 can identify the jurisdiction, such as a country, state, city, or county, covering the starting point 220 using the address or the coordinates of the starting point 220. The departure lot module 818 can identify the governing entity from a list matching either the coordinates or the address to a jurisdiction.

The departure lot module 818 can search the public records of the jurisdiction to find the boundaries defining the property where the starting point 220 is located. The departure lot module 818 can search the public record by starting from the beginning of the record and looking for an address that is equivalent to the address of the starting point 220. The search method can include algorithms such as linear and binary search algorithms. The departure lot module 818 can identify the property lot in the public records matching the address of the starting point 220 as the start lot 302.

The departure lot module 818 can also start from the starting point 220 on the map 206 of FIG. 2 and move in one direction until a divisional marker, such as a street, river, or a boarder, is found. The departure lot module 818 can repeat this search in different directions to find the divisional markers defining the area where the starting point 220 is located. The number of searches in different directions or the increment can be defined by the search level 608 of FIG. 6. The departure lot module 818 can identify the area where the starting point 220 is located as the start lot 302.

The departure lot module 818 can also search for descriptions from the operators of the starting point 220, such as a webpage or recorded messages, to find areas associated with the starting point 220. The departure lot module 818 can extract the name identifying the starting point 220, such as Disneyland™, using a list matching addresses or coordinates to establishment names.

The departure lot module 818 can search other public records, such as the World Wide Web or the phone listings, for messages with its owners matching the name of the starting point 220. The departure lot module 818 can receive the location information of the starting point 220 from the message. For example, the departure lot module 818 can find the webpage of the starting point 220 and extract the location and shape of the plaza where the starting point 220 is located from the directions, location, and parking lot information listed in the webpage to identify the start lot 302.

The departure lot module 818 can use the second control unit 734 and the second storage unit 746, or the location unit 720 to identify the address of the starting point 220. The departure lot module 818 can use the first control unit 712 or the second control unit 734 to search for and identify the start lot 302.

The purpose of the arrival lot module 820 is to find the details of the area around the destination 222. The arrival lot module 820 identifies the destination lot 312 associated with the destination 222. The arrival lot module 820 can operate like the departure lot module 818 by locating the boundary of the property lot where the destination 222 is located.

The methods for locating the boundary of the property lot where the destination 222 is located can be the same as that of the departure lot module 818. The arrival lot module 820 can identify the property lot in the public records matching the address of the destination 222 as the destination lot 312.

The arrival lot module 820 can also search for divisional markers on the map 206 or for descriptions from the operators of the destination 222 in the same way as the departure lot module 818. The arrival lot module 820 can identify the destination lot 312 as the area on the map 206 enclosing the destination 222 or as the area defined by the operator of the destination 222.

The purpose of the arrival lot module 820 is also to calculate the vehicle damage rate 504 of FIG. 5 of the destination lot 312. The arrival lot module 820 can log traffic accidents or various vehicle damages, such as paint damage from vandalism or ship hull damage due to poorly maintained dock. The arrival lot module 820 can calculate the vehicle damage rate 504 based on the number of such damages within a preselected period of time.

For example, the vehicle damage rate 504 can be 2 if the arrival lot module 820 has logged two incidents of pedestrians scratching a parked vehicle in the destination lot 312 within the last month. Also for example, the vehicle damage rate 504 can be LOW if the arrival lot module 820 has logged only one incident of vehicle damage within the last six months and the threshold for LOW is defined as 3 incidents or lower. The thresholds for different classifications can be predetermined by the navigation system 100, the software manufacturer, the user, or combination thereof.

The arrival lot module 820 can also access a data base, such as police records, government agency records, or records kept by property owners to access incidents of vehicle damage. The arrival lot module 820 can calculate the vehicle damage rate 504 based on a predetermined length of period as described above.

The arrival lot module 820 can also calculate the vehicle damage rate 504 by dividing the total number of incidents associated with the property by a unit of time. For example, the destination lot 312 that has had 12 incidents of vehicle damage over ten years can have the vehicle damage rate 504 of 1.2 incidents per year.

The arrival lot module 820 can identify the operation hours 402 of FIG. 4 and the traffic flow rate 404 of vehicles traveling through the destination lot 312. The arrival lot module 820 can identify the operation hours 402 by identifying the earliest opening time amongst the establishments within the destination lot 312 on the day having the departure time 230. The arrival lot module can also identify the operation hours 402 by identifying the earliest closing time amongst the establishments within the destination lot 312 for the applicable day.

For example, if the destination lot 312 has the earliest store opening time of 6:00 AM and the latest store closing of 9:00 PM amongst all of the stores within the destination lot 312, the operation hours 402 will be from 6:00 AM to 9:00 PM. The arrival lot module 820 can obtain the operating hours of the individual establishments by querying the establishments, extracting them from publically available information, such as websites, or extracting from a database.

The arrival lot module 820 can identify the traffic flow rate 404 of FIG. 4 by querying the owner or management of the destination lot 312 or by extracting from a database. The arrival lot module 820 can also identify the traffic flow rate 404 by counting the number of vehicles entering and leaving the destination lot 312. The total count of vehicle ingress and egress can be used to calculate the traffic flow rate 404 based on the intervals used to calculate the rate, such as hour, lunch time, or traffic time.

The arrival lot module 820 can use the first control unit 712 and the first storage unit 714, the second control unit 734 and the second storage unit 746, or the location unit 720 to identify the address of the destination 222. The arrival lot module 820 can use the first control unit 712 or the second control unit 734 to search for and identify the destination lot 312.

The purpose of the access point module 822 is to locate entrances and exits belonging to the start lot 302 and the destination lot 312. The access point module 822 locates the access ways 304 of FIG. 3 at the start lot 302 and the destination lot 312.

The access point module 822 can locate the access ways 304 by searching the map 206. The access point module 822 can start from a point on the boundary of the start lot 302 or the destination lot 312 on the map 206 and move in one direction until there is an area where vehicles can enter or exit. The access ways 304 can be the area where vehicles can enter or exit the start lot 302 or the destination lot 312, such as a gate or a runway.

The access point module 822 can locate the access ways 304 also by receiving information regarding the access ways 304 from operators of the start lot 302 or the destination lot 312. The access point module 822 can search for messages from the operators of the start lot 302 or the destination lot 312 in the same way as the departure lot module 818 and the arrival lot module 820. The access point module 822 can receive the information regarding the location of the access ways 304 from the messages of the operators of the start lot 302 or the destination lot 312.

The access point module 822 can use the first control unit 712 and the first storage unit 714 to select the starting point 220 to locate the access ways 304. The access point module 822 can also use the second control unit 734 and the second storage unit 746 to locate the access ways 304.

The purpose of the vehicle storage module 824 is to locate a place for storing the vehicle upon arriving at the destination lot 312. The vehicle storage module 824 identifies the parking stall 318 of FIG. 3 within the destination lot 312 with a distance between the destination 222 and the parking stall 318 is the minimal.

The vehicle storage module 824 can identify the parking stall 318 by identifying areas where a vehicle can be stored and identifying the nearest available storage area. The vehicle storage module 824 can identify areas for vehicle storage by searching the map 206 or by receiving vehicle storage information from the operators of the destination lot 312.

The vehicle storage module 824 can start from the destination 222 and search in one direction until an area for storing vehicles, the parking search limit 602 of FIG. 6, or the boundary of the destination lot 312 is found. An area for storing vehicles can be designated for storing vehicles by the operator of the destination lot 312 or can be an area that is not occupied by a physical structure, such as a building or a sidewalk, which is not used as a throughway for vehicles.

The vehicle storage module 824 can repeat the search in different directions. The total number of the search or the increments of the directions can be specified by the search level 608. Each time an area for storing vehicles is found, the vehicle storage module 824 can calculate the distance between the destination 222 and the found area. The distance can be calculated by measuring the distance between the destination 222 and the found area on the map 206 and multiplying the distance by a scale factor used by the map.

The vehicle storage module 824 can also calculate the distance between the destination 222 and the found area by using the coordinates for the destination 222 and the found area. The vehicle storage module 824 can utilize the formula or table associated with each coordinate system for calculating the distance between coordinates. The distance can be along a straight line between the two points or along a line where a person can travel, such as open space or a sidewalk.

The vehicle storage module 824 can store the first found vehicle storage area as the parking stall 318 and repeat the search in a different direction. When a different vehicle storage area is found, the vehicle storage module 824 can compare the distance of the parking stall 318 to the distance of the newly found area and store the location with the shorter distance as the parking stall 318.

The vehicle storage module 824 can repeat the search as specified by the search level 608, such as every 10 degrees or along North, East, South, and West. The search level 608 can be predetermined by the navigation system 100, the user, or the software manufacturer. The search can be repeated in a sequential order until the original direction is reached.

If the search level 608 indicates a number for repetition, the increment can be determined by dividing the total directions by the number of repetition. For example, if the search level 608 specifies four repetitions, the increment can be 90 degrees in a 360 degree system.

The vehicle storage module 824 can also search in a different method. For example, the vehicle storage module 824 can find the most northern point of the boundary of the destination lot 312. The vehicle storage module 824 can move south from the northern most point by the increment specified by the search level 608, such as seven feet, and search for an area available for storing a vehicle in an east-west direction until the boundaries are found. The east-west direction search between the boundaries can be repeated every increment until the most southern point of the boundary of the destination lot 312 is reached.

The vehicle storage module 824 can operate differently to find the parking stall 318. For example, the vehicle storage module 824 can start by searching in different directions as previously described and storing all available vehicle storage areas. The vehicle storage module 824 can measure the distance between the destination 222 and each available vehicle storage areas. The vehicle storage module 824 can compare the distances and identify the parking stall 318 as the area having the shortest distance to the destination 222.

The vehicle storage module 824 can also identify areas for vehicle storage by receiving vehicle storage information from the operators of the destination lot 312. The vehicle storage module 824 can receive the vehicle storage information can be received in the same way as described in identifying the start lot 302 and the destination lot 312. For example, the vehicle storage module 824 can obtain the location of all parking lots, or the location or name of all open parking spaces from the operator of the destination lot.

The vehicle storage module 824 can calculate the distance between the obtained parking areas. The vehicle storage module 824 can compare the distances and identify the closest area as the parking stall 318.

The vehicle storage module 824 can use the first control unit 712 or the second control unit 734 to identify the parking stall 318. The vehicle storage module 824 can use the first control unit 712 along with the second control unit 734 and the second storage unit 746 to identify the parking stall 318.

The purpose of the co-tenant module 806 is to identify any establishment or structure within the start lot 302 or the destination lot 312 that requires the traveler to be cautious. The co-tenant module 806 can include an origin-hazard module 826 and a destination-hazard module 828.

The purpose of the origin-hazard module 826 is to identify any establishment or structure within the start lot 302 that requires the traveler to be cautious. The origin-hazard module 826 identifies the origin-lot hazard 308 of FIG. 3 within the start lot 302 and the origin-lot hazard 308 requires the cautionary attention 502 of FIG. 5.

The origin-hazard module 826 can identify the origin-lot hazard 308 by searching within the start lot 302 for the map entity 214 of FIG. 2 that has the cautionary attention 502 near the departure time 230 of FIG. 2. The origin-hazard module 826 can start from the starting point 220 and search in one direction until the map entity 214 or the boundary of the start lot 302 is found.

The origin-hazard module 826 can repeat the search in different directions, changing the directions determined by the search level 608. The search methods of the origin-hazard module 826 can be the same as the vehicle storage module 824 searching for the parking stall 318.

After locating the map entity 214, the origin-hazard module 826 can search for the cautionary attention 502 tied to the map entity 214 in the same way as the vehicle storage module 824 searching for available storages areas for the vehicle. The cautionary attention 502 can be tied to the map entity 214 by the user, the navigation system 100, software manufacturer, the map entity 214, or a combination thereof.

The origin-hazard module 826 can obtain the time associated to the cautionary attention 502 and compare it to the departure time 230. The cautionary attention 502 is near the departure time 230 if the two occur within the warning time threshold 610 of FIG. 6. The cautionary attention 502 can be determined as near the departure time 230 when the difference in time between the two events is less than or equal to the time period specified in the warning time threshold 610.

The warning time threshold 610, such as 30 minutes or before the end of day, can be predetermined by the user, the navigation system 100, software manufacturer, the map entity 214, or a combination thereof. The origin-hazard module 826 can identify the map entity 214 within the start lot 302 that has the cautionary attention 502 occurring near the departure time 230 as the origin-lot hazard 308.

The origin-hazard module 826 can use the first control unit 712 or the second control unit 734 to identify the origin-lot hazard 308. The origin-hazard module 826 can also use the first control unit 712 along with the second control unit 734 and the second storage unit 746 to identify the origin-lot hazard 308.

The purpose of the destination-hazard module 828 is to identify any establishment or structure within the destination lot 312 that requires the traveler to be cautious. The destination-hazard module 828 identifies the destination-lot hazard 316 of FIG. 3, where the destination-lot hazard 316 is within the destination lot 312 and the destination-lot hazard 316 requires the cautionary attention 502.

The destination-hazard module 828 can identify the destination-lot hazard 316 by searching for the map entity 214 within the destination lot 312 having the cautionary attention 502 occurring near the estimated arrival time 232 of FIG. 2. The search for the map entity 214, and search for the cautionary attention 502 tied to the map entity 214 can be similar to the origin-hazard module 826. The time associated to the cautionary attention 502 can be compared to the estimated arrival time 232 in the same way as the comparison made to the departure time 230 in the origin-hazard module 826.

The origin-hazard module 826 can use the first control unit 712 or the second control unit 734 to identify the destination-lot hazard 316. The origin-hazard module 826 can also use the first control unit 712 along with the second control unit 734 and the second storage unit 746 to identify the destination-lot hazard 316.

The purpose of the neighbor module 808 is to identify any establishment or structure near the start lot 302 and the destination lot 312 that requires the traveler to be cautious. The neighbor module 808 can include a near-origin hazard module 830 and a near-destination hazard module 832.

The purpose of the near-origin hazard module 830 is to identify any establishment or structure near the start lot 302. The near-origin hazard module 830 can identify the first route-hazard 310 of FIG. 3 geographically near the near the start lot 302 and the first route-hazard 310 requires the cautionary attention 502.

The near-origin hazard module 830 can identify the first route-hazard 310 by searching the area surrounding the start lot 302 for the map entity 214 that has the cautionary attention 502 near in time to the departure time 230. The near-origin hazard module 830 can start from the start lot 302 and search in one direction until the map entity 214 is found or until the origin warning zone 604 of FIG. 6 is reached. The search can be limited to a predetermined amount of time, such as 5 minutes, before and after the departure time 230.

The near-origin hazard module 830 can repeat the search in different directions, changing the direction in increments determined by the search level 608. The search methods of the near-origin hazard module 830 can be the same as the vehicle storage module 824 searching for the parking stall 318.

The near-origin hazard module 830 can use the origin warning zone 604 as the distance limit for searching the map entity 214. Same as the boundary of the start lot 302 ending the search for the map entity 214, the near-origin hazard module 830 can end the search after reaching the end of the origin warning zone 604.

The origin warning zone 604 can be the threshold defining the map entity 214 that is geographically near the start lot 302. For example, the map entity within 25 miles of or that is adjacent to the start lot 302 can be defined as being near. The user, the navigation system 100, software manufacturer, or combination thereof can define the distance for considering the map entity 214 as being near.

After locating the map entity 214, the near-origin hazard module 830 can search for and obtain the cautionary attention 502 tied to the map entity 214 in the same way as the origin-hazard module 826. The near-origin hazard module 830 can compare the time associated with the cautionary attention 502 and the departure time 230 to determine if they are near each other in the same way as the origin-hazard module 826.

The near-origin hazard module 830 can use the first control unit 712 or the second control unit 734 to identify the first route-hazard 310. The near-origin hazard module 830 can use the first control unit 712 along with the second control unit 734 and the second storage unit 746 to identify the first route-hazard 310.

The purpose of the near-destination hazard module 832 is to identify any establishment or structure near the destination lot 312. The near-destination hazard module 832 identifies the last route-hazard 320 of FIG. 3 geographically near the destination lot 312 and the last route-hazard 320 requires the cautionary attention 502.

The near-destination hazard module 832 can search geographic area surrounding the destination lot 312 to find the map entity 214 in the same way as the near-origin hazard module 830 using the destination warning zone 606 of FIG. 6 as the limit. The near-destination hazard module 832 can search for the cautionary attention 502 tied to the map entity 214 in the same way as the origin-hazard module 826.

The near-destination hazard module 832 can also compare the time associated with the cautionary attention 502 and the estimated arrival time 232 to determine if they are near in time to each other in the same way as the origin-hazard module 826 compares the time associated with the cautionary attention 502 and the departure time 230. The near-destination hazard module 832 can identify the map entity 214, having the cautionary attention 502 occurring near the estimated arrival time 232, near the destination lot 312 as the last route-hazard 320.

The near-destination hazard module 832 can use the first control unit 712 or the second control unit 734 to identify the last route-hazard 320. The near-destination hazard module 832 can use the first control unit 712 along with the second control unit 734 and the second storage unit 746 to identify the last route-hazard 320.

The purpose of the route calculation module 810 is to calculate the vehicle travel route 218. The details of the operations of the route calculation module 810 will be discussed below.

The purpose of the warning module 812 is to alert the user of the locations that require the traveler to be cautious and what to be cautious of. The warning module 812 can include a harm threshold module 834 and a caution display module 836.

The purpose of the harm threshold module 834 is to determine when the destination lot 312 is dangerous enough for a warning should be issued. The harm threshold module 834 sets the damage threshold 506 of FIG. 5.

The harm threshold module 834 can set the damage threshold 506 by searching and obtaining the likelihood of damage belonging to the map entity 214 within a certain distance from the destination lot 312. The distance limit such as 1 kilometer, same postal grouping, or within two city blocks, can be predetermined by the user, software manufacturer, the navigation system 100, or a combination thereof.

The harm threshold module 834 can average the likelihood of damage found in areas within the distance limit. The damage threshold 506 can be a percentage determination of the average. For example, the damage threshold 506 can be set to the average or 10% above the average. The percentage relationship between the average and the damage threshold 506 can be predetermined by the user, software manufacturer, the navigation system 100 or combination thereof.

The harm threshold module 834 can set the damage threshold 506 in different ways. For example, the harm threshold module 834 can refer to a table having different levels of thresholds for different types of destinations. The harm threshold module 834 can start from the beginning of the table and search for a type of name matching that of the destination 222 and determine the associated value as the damage threshold 506. The table can be predetermined by the user, software manufacturer, the navigation system 100, or combination thereof. Also, for example, the harm threshold module 834 can query the user to set the damage threshold 506.

The harm threshold module 834 can use the first control unit 712 or the second control unit 734 to set the damage threshold 506 or identify the cautionary attention 502. The harm threshold module 834 can also use the first control unit 712 along with the second control unit 734 and the second storage unit 746 to set the damage threshold 506 or identify the cautionary attention 502.

The purpose of the caution display module 836 is to alert the user of the locations along the vehicle travel route 218 the traveler should be cautious. The caution display module 836 can generate the warnings when the vehicle travel route 218 is first displayed, during travel, when the traveler is within a predetermined distance from the location of the cautionary attention 502, or combination thereof.

The caution display module 836 can generate the damage warning 508 of FIG. 5 based on the vehicle damage rate 504 of FIG. 5 meeting or exceeding the damage threshold 506. The caution display module 836 can lay the damage warning 508 over the map 206 in the same location as the destination lot 312.

The caution display module 836 can generate the damage warning 508 when the vehicle travel route 218 is first displayed, when the traveler is within a predetermined distance to the destination lot 312, or combination thereof. The distance away from the destination lot 312 for generate the vehicle damage rate 504 can be predetermined by the user, software manufacturer, the navigation system 100, or combination thereof.

The caution display module 836 can also generate the departure warning 510 of FIG. 5, the route start warning 512 of FIG. 5, the approach warning 514 of FIG. 5, the arrival warning 516 of FIG. 5, or combination thereof based on a time of day when the cautionary attention 502 is required.

The caution display module 836 can identify the cautionary attention 502 when the map entity 214 does not provide one. The caution display module 836 can identify the name or the type belonging to the map entity 214 from the map 206 of FIG. 2. The harm threshold module can search the predetermined table for the type or name of the map entity 214 and determine the associated event as the cautionary attention 502.

For example, if a particular school does not provide the cautionary attention 502, the caution display module 836 can identify the name or they type of school, such as elementary or special education. The caution display module 836 search the table predetermined by the user, the software manufacturer, the navigation system 100, or combination thereof, to find the name or the type of school. The caution display module 836 can determine the starting or ending time of a class, lunch time, or a school activity as the time of day when the cautionary attention 502 is required.

The caution display module 836 can generate the various warnings, such as the departure warning 510 or the approach warning 514, when the departure time 230 and the vehicle travel route 218 is being calculated. The various warnings can be considered in determining the departure time 230 and the vehicle travel route 218. The details of the consideration will be discussed below.

The caution display module 836 can also generate the various warnings as the traveler approaches the map entity 214 having the associated warning. The required proximity for generate each warning can be predetermined by the software manufacturer, the navigation system 100, the user, or combination thereof.

For example, the caution display module 836 can generate the departure warning 510 when the traveler is within a certain distance, such as 100 feet, of the origin-lot hazard 308, or within the boundaries of the start lot 302. Also, for example, the caution display module 836 can generate the approach warning 514 when the traveler is within a certain distance, such as 1 mile or within two blocks, of the last route-hazard 320.

The caution display module 836 can use the first control unit 712 or the second control unit 734 to locate where to place the relevant warning. The caution display module 836 can use the first control unit 712 along with the location unit 720 of FIG. 7 and the first display interface 730 of FIG. 7 or the second display interface 740 of FIG. 7 to generate the warning.

The endpoint identification module 802 can select the starting point 220 and the destination 222 using the first control unit 712 and the first storage unit 714. The address or coordinates representing the starting point 220 and the destination 222 can be utilized to access the corresponding locations on the map 206 stored in the first storage unit 714. The endpoint identification module 802 can display the starting point 220 and the destination 222, along with the map 206, through the first display interface 730.

Alternatively, the endpoint identification module 802 can select the starting point 220 and the destination 222 using the second control unit 734 and the second storage unit 746. The address or coordinates representing the starting point 220 and the destination 222 can be utilized to access the corresponding locations on the map 206 stored in the second storage unit 746. The endpoint identification module 802 can display the starting point 220 and the destination 222, along with the map 206, through the second display interface 740.

The endpoint identification module 802 can alternatively utilize a combination of the first device 102 and the second device 106. For example, the address or coordinates representing the starting point 220 and the destination 222 can be stored in the first storage unit 714 but compared to the map 206 stored in the second storage unit 746. The first control unit 712 and the second control unit 734 can be linked through the first communication unit 716, the communication path 104, and the second communication unit 736. The two locations can be displayed on the first display interface 730, the second display interface 740, or both.

Also for example, the first device 102 can identify the starting point 220 while the second device 106 can identify the destination 222. The first display interface 730 can display the starting point 220 while the second display interface 740 displays the destination 222.

The storage lot module 804 can identify the start lot 302 and the destination lot 312 in the same way as the endpoint identification module 802 identifying the starting point 220 and the destination 222 describe above. The co-tenant module 806 can identify the origin-lot hazard 308 and the destination-lot hazard 316 in the same way as the endpoint identification module 802 identifying the starting point 220 and the destination 222 describe above.

The neighbor module 808 can identify the first route-hazard 310 and the last route-hazard 320 in the same way as the endpoint identification module 802 identifying the starting point 220 and the destination 222 describe above. The warning module 812 can display the various warnings, such as the cautionary attention 502 or the damage warning 508, in the same way as the endpoint identification module 802 displays the starting point 220 and the destination 222.

Figure 9:
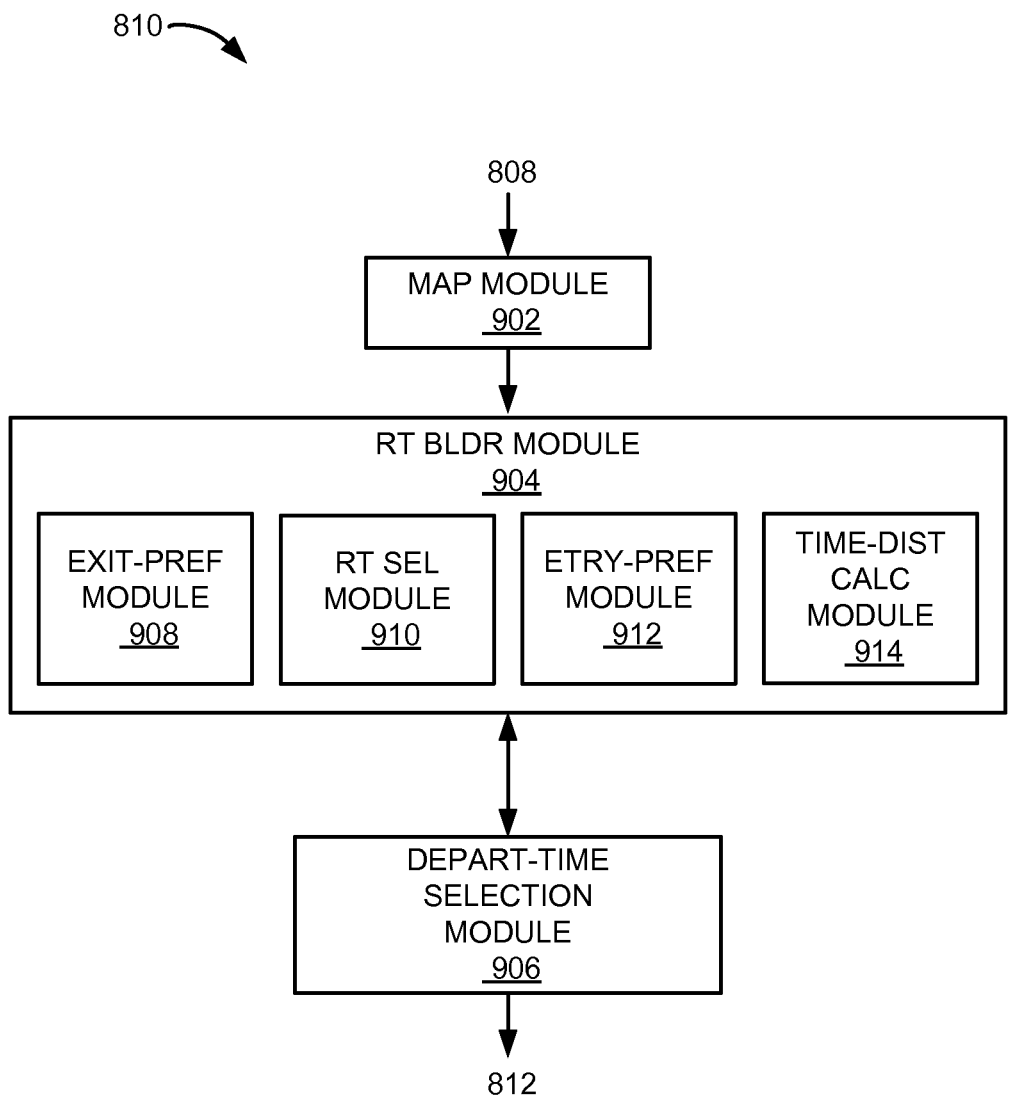
FIG. 9 is a detailed view of the route calculation module of FIG. 8.

Referring now to FIG. 9, therein is shown a detailed view of the route calculation module 810 of FIG. 8. The purpose of the route calculation module 810 is to determine a route for travelling from one location to another. The route calculation module 810 can calculate the vehicle travel route 218 of FIG. 2. The route calculation module 810 can include a map module 902, a route builder module 904, and a departure-time selection module 906.

The map module 902 can be coupled to the route builder module 904. The route builder module can be coupled to the departure-time selection module 906.

The purpose of the map module 902 is to locate and display the map 206 of FIG. 2. The map module 902 can locate the map 206 by locating an area map that has the starting point 220 of FIG. 2 and the destination 222 of FIG. 2. The navigation system 100 can store different area maps, which the map module 902 can access to locate an area map that has the starting point 220 and the destination 222.

The map module 902 can determine the geographic area map having the starting point 220 and the destination 222 as the map 206. The map module 902 can display the map 206 on the display interface 202 of FIG. 2. The map module 902 can also mark the locations of the starting point 220 and the destination 222 on the map 206. The map module 902 can mark the locations by overlaying a designated marking, such as a label, dot, shape, arrow, or combination thereof, over the location of the desired points on the map 206.

For example, the map 206 can be the area map of United States or North America when the destination 222 is in New York State and the starting point 220 is in California. The map module 902 can mark the destination 222 within the state of New York and the starting point 220 within California accordingly. Also, for example, if the starting point 220 and the destination 222 is within a couple of city blocks, the map 206 can be a portion of the street level map that contains both the starting point 220 and the destination 222 and mark the two locations.

The map module 902 can use the first storage unit 714 of FIG. 7 or the second storage unit 746 of FIG. 7 to store the different area maps. The map module 902 can use the first control unit 712 of FIG. 7, the second control unit 734 of FIG. 7, or combination thereof to access the area maps and determine the map 206. The map module 902 can also use the first control unit 712 and the first display interface 730 of FIG. 7 or the second control unit 734 of FIG. 7 and the second display interface 740 of FIG. 7 to display the map 206.

The purpose of the route builder module 904 is to determine the desired route for going from the starting point 220 to the destination 222. The route builder module 904 can calculate the vehicle travel route 218 from the starting point 220 to the destination 222 with the vehicle travel route 218 traversing through the start lot 302 of FIG. 3 and the destination lot 312 of FIG. 3 through the preferred exit-point 306 of FIG. 3 and the preferred entry point 314 of FIG. 3 for displaying on the first device 102 of FIG. 7.

The route builder module 904 can include overarching rules for calculating the vehicle travel route 218. The route builder module 904 can have rules such as follow traffic regulation or avoid U-turns as overarching rules for calculating the vehicle travel route 218. The overarching rules can be to follow the path regulation 212 associated with the different elements of the map 206, such as left turn restriction at a certain node or one way travel for a certain path.

The route builder module 904 can order the possible choices at a given node or access way. For example, the route builder module 904 can have the preference order as pass through, right turn, protected left turns, U-turns, and unprotected left turns for right-side travel traffic systems such as in United States or Canada.

The route builder module 904 can use the first storage unit 714 or the second storage unit 746 to store the overarching rules and the order for the choices. The route builder module 904 can use the first control unit 712, the second control unit 734, or combination thereof to calculate the vehicle travel route 218. The route builder module 904 can also use the first control unit 712 and the first display interface 730 or the second control unit 734 and the second display interface 740 to display the vehicle travel route 218.

The route builder module 904 can include an exit-preference module 908, a route selection module 910, an entry-preference module 912, and a time-distance calculation module 914. The purpose of the exit-preference module 908 is to determine the desired exit for leaving the start lot 302 and the direction of travel. The exit-preference module 908 selects the preferred exit-point 306 of FIG. 3 from the start lot 302.

The exit-preference module 908 may be limited in selecting the preferred exit-point 306 if the start lot 302 only has one exit. The direction of travel can be the direction that decreases the distance to the destination 222 at the fastest rate. If more than one direction the same rate of decrease, the overarching rule can be used as default.

In other instances, the exit-preference module 908 can select the preferred exit-point 306 using the route selection criteria 612 of FIG. 6. For example, when the route selection criteria 612 has safety as the first priority, the exit-preference module 908 can select the access ways 304 of FIG. 3 that is the furthest away from the origin-lot hazard 308 and the first route-hazard 310 as the preferred exit-point 306.

Also, for example, when the route selection criteria 612 has time or distance as the first priority, the exit-preference module 908 can select the access ways 304 that allows for travel in the direction that decreases the overall distance to the destination 222. When the start lot 302 has no such exit-point, the exit-preference module 908 can select the access ways 304 that requires the shortest distance or time to travel to the node 210 of FIG. 2 that allows for travel in the direction that decreases the overall distance to the destination 222.

The exit-preference module 908 can use the first storage unit 714 or the second storage unit 746 to store the route selection criteria 612. The exit-preference module 908 can use the first control unit 712, the second control unit 734, or combination thereof to select the preferred exit-point 306. The exit-preference module 908 can also use the first control unit 712 and the first display interface 730 or the second control unit 734 and the second display interface 740 to display the preferred exit-point 306.

The purpose of the route selection module 910 is to calculate the best set of travel paths for going from the starting point 220 to the destination 222. The route selection module 910 can start from the preferred exit-point 306 and selecting the path 208 of FIG. 2 following using the route selection criteria 612.

The route selection module 910 can start from the preferred exit-point 306 and find the node 210 appearing first in the direction selected by the exit-preference module 908. At the node 210, the route selection module 910 can select the segment of the path 208 that satisfies the route selection criteria 612 for selecting path segments. The selecting process can be the same as the exit-preference module 908. The route selection module 910 will follow the path until another node appears and repeat the selection process until the destination lot 312 of FIG. 3 is reached.

The route selection module 910 can use the first control unit 712, the second control unit 734, or combination thereof to select the path 208. The route selection module 910 can use the first storage unit 714 or the second storage unit 746 to store the path 208. The route selection module 910 can also use the first control unit 712 and the first display interface 730 or the second control unit 734 and the second display interface 740 to display the path 208.

The purpose of the entry-preference module 912 is to determine the desired entrance for arriving at the destination lot 312. The entry-preference module 912 selects the preferred entry point 314 of FIG. 3 into the destination lot 312. The selection process is the same as that of the exit-preference module 908, using the route selection criteria 612 for selecting the preferred entry point 314.

After selecting the preferred entry point 314, the entry-preference module 912 can calculate the vehicle travel route 218. The entry-preference module 912 can connect the destination 222, the preferred entry point 314 and the path 208 calculated by the route selection module 910 to complete the vehicle travel route 218.

The entry-preference module 912 can use the first storage unit 714 or the second storage unit 746 to store the route selection criteria 612. The entry-preference module 912 can use the first control unit 712, the second control unit 734, or combination thereof to select the preferred entry point 314 and complete the vehicle travel route 218. The entry-preference module 912 can also use the first control unit 712 and the first display interface 730 or the second control unit 734 and the second display interface 740 to display the preferred entry point 314.

The purpose of the time-distance calculation module 914 is to determine the length of the vehicle travel route 218 and estimate the time necessary for traversing the vehicle travel route 218. The time-distance calculation module 914 can calculate the route distance 226 of FIG. 2 and the route travel time 228 of FIG. 2.

The time-distance calculation module 914 can calculate the route distance 226 by adding the distance of the segments of the path 208 and the nodes making up the vehicle travel route 218. The time-distance calculation module 914 can access the associated distance information corresponding to the path 208 and the nodes stored in the map 206.

The time-distance calculation module 914 can also calculate the route distance 226 by measuring the displayed length of the vehicle travel route 218 and multiplying that by the scale factor associated with the map 206. For example, if one inch on the map 206 represents 1200 inches or 100 feet, the map scale factor would be 1 inch to 100 feet. The vehicle travel route 218 that is 5 inches long in display can represent the route distance 226 of 6000 inches or 500 feet.

If the traffic flow rate 404 of FIG. 4 is defined as speeds along portions of the map 206, the time-distance calculation module 914 can calculate the route travel time 228 by adding the time required to traverse each segment of the path 208 and the nodes making up the vehicle travel route 218. The time-distance calculation module 914 can access the associated average speed information corresponding to the path and the nodes stored in the map 206.

The time-distance calculation module 914 can divide the distance by the average speed at the corresponding time of day for the selected portion of the vehicle travel route 218 to find the time for traversing such portion. The time-distance calculation module 914 can add the resulting times to calculate the route travel time 228.

The time-distance calculation module 914 can use the first control unit 712, the second control unit 734, or combination thereof to access the speed and distance information, and to calculate the route distance 226 and the route travel time 228. The time-distance calculation module 914 can also use the first control unit 712 and the first display interface 730 or the second control unit 734 and the second display interface 740 to display the route distance 226 and the route travel time 228.

The route builder module 904 can further optimize the vehicle travel route 218. The route builder module 904 can repeat the calculation process for acquiring the vehicle travel route 218 by altering the various choices. For example, the route builder module 904 can calculate a route with the lowest amount of direction changes or lowest amount of nodes.

The route builder module 904 can calculate a score for each route based on different factors, such as number of the cautionary attention 502 of FIG. 5 near the vehicle travel route 218 or the route travel time 228. The route builder module 904 can select the route having the lowest score as the vehicle travel route 218. The repetition can be limited by the user, the navigation system 100, the software manufacturer, or combination thereof.

For illustrative purposes, the route builder module 904 is described as calculating the vehicle travel route 218 beginning from the starting point 220 and ending at the destination 222, although it is understood that the route builder module 904 can operate differently. For example, the route builder module 904 can calculate the vehicle travel route 218 from both ends and meet at a middle point. Also, for example, the route builder module 904 can calculate the path section first and then select the preferred entry point 314 and the preferred exit-point 306.

The route builder module 904 can also utilize known routing algorithms such as Dijkstra's algorithm or Johnson's algorithm. In using the routing algorithms, the route builder module 904 can use the starting point 220 and the destination 222 as the end points and treat the access ways the same as nodes.

The purpose of the departure-time selection module 906 is to find a different time for departure that is better suited for travelling on the vehicle travel route 218. The departure-time selection module can select the suggested leaving time 406 of FIG. 4 when the traffic flow rate 404 exceeds a predetermined amount than at the departure time 230.

The departure-time selection module 906 can select the suggested leaving time 406 by determining the segment in the vehicle travel route 218 having the traffic flow rate 404 that is the slowest. The departure-time selection module 906 can determine the slowest segment of the vehicle travel route 218 by sorting the segments according to the traffic flow rate 404.

The departure-time selection module 906 can search for a later time where the traffic flow rate 404 of the slowest segment is improved by a threshold amount. For example, if the vehicle travel route 218 is near a school at the end of a school day, the departure-time selection module 906 can search for a later time when the traffic flow rate 404 subsides. The departure-time selection module 906 can limit the search to within the bounds of the operation hours 402 of FIG. 4.

The threshold amount of improvement for the traffic flow rate 404 can be used to ignore trivial improvements in the traffic flow rate 404 and the difference between the future travel duration 408 of FIG. 4 and the route travel time 228. The threshold amount can be a limit, such as at least 10 minute improvement over the segment, at least 10 percent decrease in the traffic flow rate 404, or combination thereof. The threshold amount can be set by the navigation system 100, the user, the software manufacturer, or combination thereof.

The departure-time selection module 906 can designate the suggested leaving time 406 as the selected time when the traffic flow rate 404 of the slowest segment in the vehicle travel route 218 is better than the threshold amount. If no other time improves the traffic flow rate 404 beyond the threshold amount or if the improved time is beyond the operation hours 402, the departure-time selection module 906 can finish the calculation and the navigation system 100 can withhold from displaying the suggested leaving time 406 or the future travel duration 408.

When the suggested leaving time 406 is selected, the departure-time selection module 906 can calculate the future travel duration 408. The departure-time selection module 906 can calculate the future travel duration 408 same as the time-distance calculation module 914. The departure-time selection module 906 can use the suggested leaving time 406 in place of the departure time 230 and use the traffic flow rate 404 at the suggested leaving time 406 instead of at the departure time 230.

The departure-time selection module 906 can use the first control unit 712, the second control unit 734, or combination thereof to select the suggested leaving time 406 and calculate the future travel duration 408. The departure-time selection module 906 can also use the first control unit 712 and the first display interface 730 or the second control unit 734 and the second display interface 740 to display the suggested leaving time 406 and the future travel duration 408.

The route calculation module 810 can calculate the vehicle travel route 218 using the first control unit 712 and the first storage unit 714. The map module 902 can locate the map 206 stored in the first storage unit 714 and use the first control unit 712 to calculate the vehicle travel route 218 and the associated times and distances. The route calculation module 810 can display the vehicle travel route 218 through the first user interface 718.

Alternatively, the route calculation module 810 can calculate the vehicle travel route 218 using the second control unit 734 and the second storage unit 746. The map module 902 can locate the map 206 stored in the second storage unit 746 and use the second control unit 734 to calculate the vehicle travel route 218 and the associated times and distances. The route calculation module 810 can display the vehicle travel route 218 through the second user interface 738.

The route calculation module 810 can alternatively utilize a combination of the first device 102 and the second device 106. For example, the route calculation module 810 can locate the map 206 stored in the second storage unit 746 through the first control unit 712, the first communication unit 716, the communication path 104, and the second communication unit 736 and the second control unit 734. The route calculation module 810 can calculate the vehicle travel route 218 with the first control unit 712.

The vehicle travel route 218 can be displayed through the first display interface 730, the second display interface 740, or both. Alternatively, different portions of the vehicle travel route 218 can be displayed on the first display interface 730 and the second display interface 740.

The navigation system 100 can be partitioned between the first device 102 of FIG. 7 and the second device 106 of FIG. 7. For example, the navigation system 100 can be partition into the functional units of the first device 102, the second device 106, or a combination thereof. For example, the route calculation module 810 can be on the second device 106 and the warning module 812 can be on the first device 102.

The navigation system 100 can also be implemented as additional functional units in the first device 102 of FIG. 1, the first device 102, the second device 106, or a combination thereof. For example, the departure-time selection module 906 and the route selection module 910 can be the additional function units in the second device 106.

It has been discovered that the present invention provides the navigation system 100 that provide increased accuracy and efficiency in route for parking lot integrated routing mechanism. The vehicle travel route 218 gives rise to the benefits by including the route within, as well as leading to or going from, the parking lots associated with the origin and the destination 222. The vehicle travel route 218 can allow the user to conveniently, accurately, and safely arrive at the destination 222.

Furthermore, the exit-preference module 908 and the entry-preference module 912 provide the improvement in safety. The departure-time selection module 906 can improve the efficiency, duration, and the safety of the travel by selecting a time of day that has less traffic and danger in and geographically near the destination lot 312.

The physical transformation of the vehicle travel route 218 results in movement in the physical world, such as people using the vehicle travel route 218 for navigating the vehicle, based on the operation of the navigation system 100. The movement of people in the real world can be fed back to the navigation system 100 to further operate the navigation system 100 to navigate the vehicle.

Thus, it has been discovered that the navigation system 100 with parking lot integrated routing algorithm of the present invention furnishes important and heretofore unknown and unavailable solutions, capabilities, and functional aspects for navigating travel.

The navigation system 100 describes the module functions or order as an example. The modules can be partitioned differently. For example, the endpoint identification module 802, the storage lot module 804 and the co-tenant module 806 can determine the starting point 220 and the destination 222 simultaneously as the surrounding entities rather than sequentially. Also for example, the warning module 812 can belong to the route builder module 904. Each of the modules can operate individually and independently of the other modules.

Figure 10:
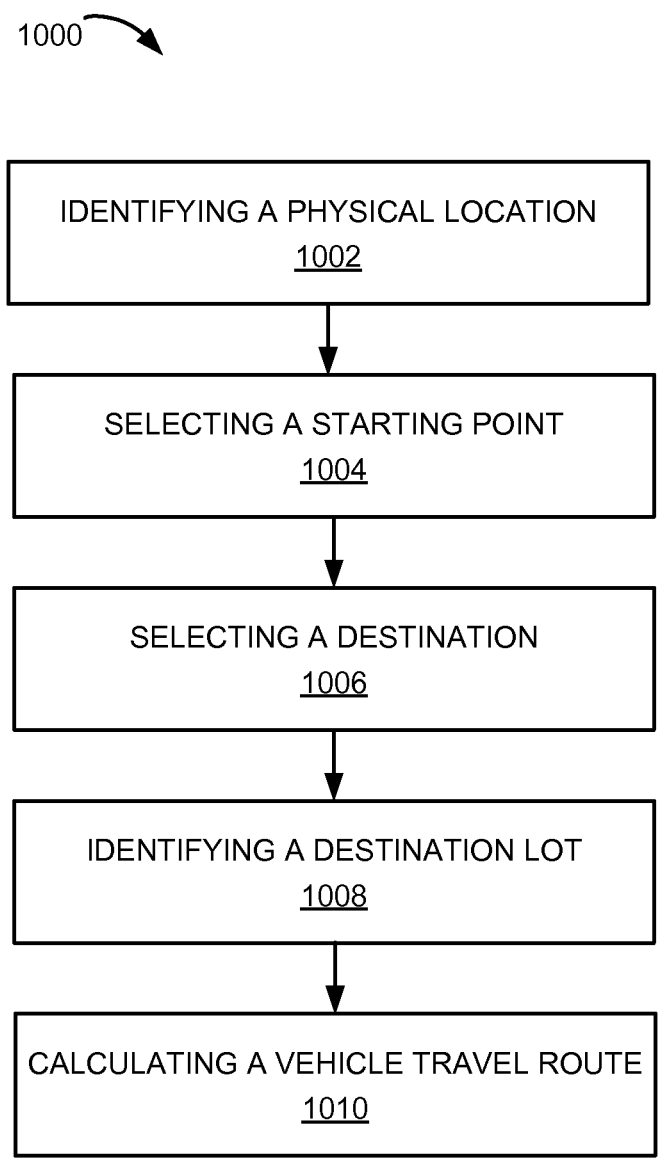
FIG. 10 is a flow chart of a method of operation of the navigation system in a further embodiment of the present invention.

Referring now to FIG. 10, therein is shown a flow chart of a method 1000 of operation of the navigation system 100 in a further embodiment of the present invention. The method 1000 includes: identifying a physical location with a location unit; selecting a starting point based on the physical location; selecting a destination; identifying a destination lot associated with the destination; and calculating a vehicle travel route from the starting point to the destination with the vehicle travel route traversing through the destination lot with a control unit for displaying on a device.

The resulting method, process, apparatus, device, product, and/or system is straightforward, cost-effective, uncomplicated, highly versatile and effective, can be implemented by adapting known components for ready, efficient, and economical manufacturing, application, and utilization.

Another important aspect of the present invention is that it valuably supports and services the historical trend of reducing costs, simplifying systems, and increasing performance.

These and other valuable aspects of the present invention consequently further the state of the technology to at least the next level.

While the invention has been described in conjunction with a specific best mode, it is to be understood that many alternatives, modifications, and variations will be apparent to those skilled in the art in light of the aforegoing description. Accordingly, it is intended to embrace all such alternatives, modifications, and variations that fall within the scope of the included claims. All matters hithertofore set forth herein or shown in the accompanying drawings are to be interpreted in an illustrative and non-limiting sense.

What is claimed is:

1. A method of operation of a navigation system comprising:
   identifying a physical location;
   selecting a starting point based on the physical location;
   selecting a destination;
   identifying a destination lot encompassing the destination and including multiple access points;
   selecting a specific access point from multiple access ways based on a route selection criteria including a set of criteria ordered according to priority of each criterion in evaluating the multiple access ways; and
   calculating with a control unit a vehicle travel route from the starting point to the destination with the vehicle travel route traversing across a portion of the destination lot and through the specific access point for traversing the vehicle travel route with a single vehicle.

2. The method as claimed in claim 1 wherein:
   selecting a specific access point includes selecting a preferred entry point into the destination lot; and
   calculating the vehicle travel route includes calculating the vehicle travel route through the preferred entry point.

3. The method as claimed in claim 1 further comprising:
   identifying a destination-lot hazard within the destination lot and the destination-lot hazard requires a cautionary attention; and
   generating an arrival warning based on a time of day when the cautionary attention is required.

4. The method as claimed in claim 1 wherein:
   identifying the destination lot includes identifying the destination lot having operation hours and a traffic flow rate of vehicles traveling through the destination lot; and further comprising:
   selecting a suggested leaving time when the traffic flow rate exceeds a predetermined amount than at a departure time.

5. A method of operation of a navigation system comprising:
   identifying a physical location;
   selecting a starting point based on the physical location;
   identifying a start lot associated with the starting point including multiple access ways;
   selecting a preferred exit-point from the multiple access ways based on a route selection criteria including a set of criteria ordered according to priority of each criterion in evaluating the multiple access ways;
   selecting a destination;
   identifying a destination lot encompassing the destination and including multiple further access ways;
   selecting a preferred entry point from the multiple access ways based on the route selection criteria; and
   calculating with a control unit a vehicle travel route from the starting point to the destination with the vehicle travel route traversing out of the start lot and across a portion of the destination lot through the preferred exit-point and the preferred entry point for traversing the vehicle travel route with a single vehicle.

6. The method as claimed in claim 5 further comprising:
   identifying an origin-lot hazard within the start lot and the origin-lot hazard requires a cautionary attention; and
   generating a departure warning based on a time of day when the cautionary attention is required.

7. The method as claimed in claim 5 further comprising:
   identifying a first route-hazard geographically near the start lot and the first route-hazard requires a cautionary attention; and
   generating a route start warning based on a time of day when the cautionary attention is required.

8. The method as claimed in claim 5 wherein:
   identifying a last route-hazard geographically near the destination lot and the last route-hazard requires a cautionary attention; and
   generating an approach warning based on a time of day when the cautionary attention is required.

9. The method as claimed in claim 5 further comprising identifying a parking stall within the destination lot with a distance between the destination and the parking stall is minimal.

10. A navigation system comprising:
    a location unit configured to identify a physical location;
    a control unit, coupled to the location unit, configured to:
      select a starting point based on the physical location;
      select a destination;
      identify a destination lot encompassing the destination and including multiple access points;
      selecting a specific access point from multiple access ways based on a route selection criteria including a set of criteria ordered according to priority of each criterion in evaluating the multiple access ways; and
    calculate a vehicle travel route from the starting point to the destination with the vehicle travel route traversing across a portion of the destination lot and through the specific access point for traversing the vehicle travel route with a single vehicle.

11. The system as claimed in claim 10 wherein the control unit is configured to:
    select a preferred entry point into the destination lot; and
    calculate the vehicle travel route through the preferred entry point.

12. The system as claimed in claim 10 wherein the control unit is configured to:
- identify a destination-lot hazard within the destination lot and the destination-lot hazard requires a cautionary attention; and
- generate an arrival warning based on a time of day when the cautionary attention is required.

13. The system as claimed in claim 10 wherein the control unit is configured to:
- identify the destination lot having operation hours and a traffic flow rate of vehicles traveling through the destination lot; and
- suggest a suggested leaving time when the traffic flow rate exceeds a predetermined amount than at a departure time.

14. The system as claimed in claim 10 wherein the control unit is configured to:
- identify a start lot associated with the starting point including multiple further access ways;
- select a preferred exit-point from the multiple further access ways based on the route selection criteria;
- select a preferred entry point into the destination lot from the multiple access ways based on the route selection criteria; and
- calculate the vehicle travel route from the starting point to the destination with the vehicle travel route traversing through the start lot and the destination lot through the preferred exit-point and the preferred entry point.

15. The system as claimed in claim 14 wherein the control unit is configured to:
- identify an origin lot hazard within the start lot and the origin-lot hazard requires a cautionary attention; and
- generate a departure warning based on a time of day when the cautionary attention is required.

16. The system as claimed in claim 14 wherein the control unit is configured to:
- identify a first route-hazard geographically near the start lot and the first route-hazard requires a cautionary attention; and
- generate a route start warning based on a time of day when the cautionary attention is required.

17. The system as claimed in claim 14 wherein the control unit is configured to:
- identify a last route-hazard geographically near the destination lot and the last route-hazard requires a cautionary attention; and
- generate an approach warning based on a time of day when the cautionary attention is required.

18. The system as claimed in claim 14 wherein the control unit is configured to identify a parking stall within the destination lot with a distance between the destination and the parking stall is minimal.

* * * * *